(12) United States Patent
Taylor et al.

(10) Patent No.: US 10,937,342 B2
(45) Date of Patent: Mar. 2, 2021

(54) SHELF EDGE SYSTEM

(71) Applicant: Process4, Inc., Chagrin Falls, OH (US)

(72) Inventors: Curtis Taylor, Chagrin Falls, OH (US); Matthew Hanson, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 16 days.

(21) Appl. No.: 15/915,623

(22) Filed: Mar. 8, 2018

(65) Prior Publication Data
US 2018/0261136 A1 Sep. 13, 2018

Related U.S. Application Data

(60) Provisional application No. 62/571,507, filed on Oct. 12, 2017, provisional application No. 62/468,524, filed on Mar. 8, 2017.

(51) Int. Cl.
| | | |
|---|---|---|
| G09F 3/18 | (2006.01) |
| G09F 3/20 | (2006.01) |
| A47F 5/00 | (2006.01) |
| A47F 11/10 | (2006.01) |
| G09F 13/00 | (2006.01) |
| F16B 1/00 | (2006.01) |

(52) U.S. Cl.
CPC ............ *G09F 3/204* (2013.01); *A47F 5/0068* (2013.01); *A47F 11/10* (2013.01); *F16B 1/00* (2013.01); *G09F 3/208* (2013.01); *G09F 13/005* (2013.01); *F16B 2001/0035* (2013.01)

(58) Field of Classification Search
CPC ........ G09F 3/204; G09F 13/005; G09F 3/208; F16B 1/00; F16B 2001/0035; A47F 5/0068; A47F 11/10
See application file for complete search history.

(56) References Cited

U.S. PATENT DOCUMENTS

| | | | | |
|---|---|---|---|---|
| 4,909,646 | A * | 3/1990 | Itazu ......................... | B41J 2/265 400/124.24 |
| 6,202,334 | B1 * | 3/2001 | Reynolds .................. | G09F 7/18 40/608 |
| 2003/0115096 | A1 * | 6/2003 | Reynolds ............... | G06Q 30/02 705/14.58 |
| 2015/0250067 | A1 * | 9/2015 | Gaddam .............. | H05K 5/0213 40/541 |
| 2015/0332616 | A1 * | 11/2015 | Ports .................... | F16M 13/022 40/544 |

* cited by examiner

*Primary Examiner* — Cassandra Davis
(74) *Attorney, Agent, or Firm* — Ulmer & Berne LLP

(57) ABSTRACT

A shelf edge system which can be easily and conveniently attached to an existing shelf system, and which has a display system capable of attracting the attention of shoppers in a store.

21 Claims, 15 Drawing Sheets

SHELF EDGE SYSTEM

CROSS REFERENCE TO RELATED APPLICATIONS

This application claims priority to U.S. Provisional Application Nos. 62/468,524, filed Mar. 8, 2017 and 62/571,507, filed Oct. 12, 2017, the disclosures of which are herein incorporated by reference in their entirety.

BACKGROUND

The present disclosure relates to shelf edge systems, particularly to a shelf edge system that includes a display system, and more particularly to a shelf edge system adaptable to attach to existing shelf edging and which utilizes a display system to attract the attention of and/or to provide information to shoppers in a store when attached to the existing shelf edging.

Many types of stores have an arrangement of aisles configured to be accessible by customers. Each aisle generally includes one or more rows of shelving units positioned side-by-side on one or both sides of the aisle. Each shelving unit can display various goods and/or products available for purchase in the store. As such, customers can walk down the aisles and view the goods and/or products displayed on the shelving units.

Each shelving unit can be further divided into a plurality of individual shelves, the individual shelves often being positioned at varying heights on the shelving unit. The individual shelves of shelving units typically have a flat top surface extending from a back wall of the shelving unit and terminating at a shelf edge. The shelf edge typically has an outwardly facing C-shaped channel built into the shelf edge thereof. The C-shaped channel allows, for example, a store worker, to insert small, thin labels (e.g., a paper price labels, sale labels, informative labels, etc.) for one or more items displayed on the individual shelves of the shelving unit.

However, the small, thin labels currently used on shelf edging are often insufficient in attracting the attention of shoppers in the store, and are often only used to display the name and price of goods and/or products on the shelf. Furthermore, traditional C-shaped channels do not provide sufficient support for attachments thereto. For example, the C-shaped channels are often too narrow and/or shallow, thereby not permitting enough space for attachment, such as, for example, electronic devices (e.g., electronic price displays, etc.) thereto.

Non-limiting examples of prior art shelf edging systems are present in: U.S. Pat. Nos. 6,622,410 and 7,480,346, which are incorporated herein by reference.

It would be desirable to provide a shelf edge system and method which is capable of attracting the attention of shoppers in a store and which can be easily and conveniently attached to an existing shelf edge.

In view of the prior art, there remains a need for a novel shelf edge system that includes one or more components that can be used to draw attention to a shelving unit in a store on which the shelf edge system is provided so as to improve the sales (and revenue) of products on a shelf system.

SUMMARY OF THE INVENTION

The present disclosure relates to shelf edge systems that include a display system, and more particularly to a shelf edge system adaptable to attach to existing shelf edging and which utilizes a display system to attract the attention of and/or to provide information to shoppers in a store when attached to the existing shelf edging.

It can be appreciated that existing display systems used in stores can have an impact on sales of one or more products and the experience of customers in the store. As such, the shelf edge systems of the present disclosure, when used in association with one or more products on a shelf in a store, can have a positive effect on sales of said products and on the customer experience in the store. Although various illumination devices and/or display systems have been developed to illuminate products on a store shelf, these existing types of display systems fail to grab the attention of a shopper. For example, existing display systems may target the illumination of one or more products on a shelf, while the presently described display system targets an outward illumination for the purpose of attracting the attention of a shopper; however, this is not required. Whereas a shopper may pass by an existing display system without noticing and/or viewing the product, the presently described shelf edge system is configured and uniquely designed to directly grab the attention of a shopper at or near the shelf edge system.

In accordance with one non-limiting embodiment of the invention, there is provided a shelf edge system that includes at least one support bracket that has a first connection arrangement and a second connection arrangement. The at least one support bracket is connected to the shelf edge by the first connection arrangement. The shelf edge system also includes a display system having a circuit board and a lighting arrangement connected to the circuit board. The circuit board can include one or more processors, batteries, resistors, LED, transistors, capacitators, inductors, diodes and switches. The lighting arrangement is adapted to emit a light in response to a signal. The shelf edge system also includes a display system bracket having a connection arrangement. The display system is mounted to a portion of the display system bracket. The connection arrangement connects the display system bracket to the second connection arrangement of the at least one support bracket.

In accordance with another and/or alternative non-limiting embodiment of the invention, the at least and support bracket further comprises a connection flange having the first connection arrangement, a support flange, and an extension flange having the second connection arrangement.

In accordance with another and/or alternative non-limiting embodiment of the invention, the extension flange and the connection flange extend perpendicularly from the support flange to form a C-shape of the at least one support bracket.

In accordance with another and/or alternative non-limiting embodiment of the invention, the first connection arrangement of the at least one support bracket includes one or more magnets.

In accordance with another and/or alternative non-limiting embodiment of the invention, the second connection arrangement of the at least one support bracket and the connection arrangement of the display system bracket both comprise a ratcheting portion.

In accordance with another and/or alternative non-limiting embodiment of the invention, the shelf edge system further includes at least one motion detection system connected to the circuit board. The at least one motion detection system provides the signal to the lighting arrangement based on a movement detected by the at least one motion detection system.

In accordance with another and/or alternative non-limiting embodiment of the invention, the shelf edge system further includes a display system housing secured to the display system bracket and adapted to cover and protect the display system.

In accordance with another and/or alternative non-limiting embodiment of the invention, the display system housing further includes a generally vertically oriented wall portion and a generally horizontally oriented wall portion.

In accordance with another and/or alternative non-limiting embodiment of the invention, the display system optionally includes a screen at least partially disposed within the generally vertically oriented wall portion of the display system housing.

In accordance with another and/or alternative non-limiting embodiment of the invention, the screen is adapted to diffuse the light emitted by the lighting arrangement in response to the signal.

In accordance with another and/or alternative non-limiting embodiment of the invention, lighting arrangement is an LED, OLED, or the like display, and the screen is optionally eliminated.

In accordance with another and/or alternative non-limiting embodiment of the invention, the shelf edge system further includes a first and second U-shaped channel on the generally vertically oriented wall portion and an interchangeable translucent panel supported by the first and second U-shaped channels.

In accordance with another and/or alternative non-limiting embodiment of the invention, the interchangeable translucent panel is located in front of the screen of the display system and the screen illuminates the interchangeable translucent panel.

In accordance with another and/or alternative non-limiting embodiment of the invention, the shelf edge system further includes a power supply mounted to the support bracket and electronically connected to the display system.

In accordance with another and/or alternative non-limiting embodiment of the invention, the power supply further includes a removable battery pack stored in an enclosure and containing one or more batteries.

In accordance with another and/or alternative non-limiting embodiment of the invention, the shelf edge system further includes at least one communication device in electronic communication with the display system.

In accordance with another and/or alternative non-limiting embodiment of the invention, the at least one communication device further includes one or more contacts adapted to communicate with an adjacent shelf edge system.

In accordance with another and/or alternative non-limiting embodiment of the invention, the at least one communication device is in wired or wireless communication with a central server.

In accordance with another and/or alternative non-limiting embodiment of the invention, there is provided a method for using a shelf edge system that includes a) providing at least one support bracket including a first connection arrangement and a second connection arrangement, the at least one support bracket being connected to the shelf edge by the first connection arrangement; a display system including a circuit board and a lighting arrangement connected to the circuit board; and a display system bracket including a connection arrangement, the display system being mounted to a portion of the display system bracket, and the connection arrangement connecting the display system bracket to the second connection arrangement of the at least one support bracket; b) detecting a movement with at least one motion detection system; c) providing a signal in response to detecting the movement with the at least one motion detection system; and d) emitting a light with the lighting arrangement in response to the signal.

In accordance with another and/or alternative non-limiting embodiment of the invention, there is provided a shelf edge system, comprising a) at least one support bracket including a connection flange, a support flange, and an extension flange, the connection flange extending perpendicularly from the support flange and including a first connection arrangement, the extension flange extending perpendicularly from the support flange and parallel to the connection flange and including a second connection arrangement; b) a display system including a lighting arrangement and at least one motion detection system connected to a circuit board, the lighting arrangement being adapted to emit a light in response to a signal generated by the at least one motion detection system; c) a display system bracket including a connection arrangement; d) a display system housing at least partially covering the display system; and e) a power supply electrically connected to the display system, and wherein the first connection arrangement of the connection flange connects the at least one support bracket to the shelf edge, the second connection arrangement of the extension flange connects to the connection arrangement of the display system bracket, the display system is mounted to a portion of the display system bracket, the display system housing is secured to the display system bracket, and the power supply is mounted to the support flange of the support bracket.

It is accordingly one non-limiting object of the present disclosure to provide an improved shelf edge system.

Another and/or alternative non-limiting object of the present disclosure is the provision of a shelf edge system that includes a display system.

Another and/or alternative non-limiting object of the present disclosure is the provision of a shelf edge system that includes a display system which can be used to attract the attention of a shopper in a store.

Another and/or alternative non-limiting object of the present disclosure is the provision of a shelf edge system that includes one or more support brackets, one or more display system brackets, one or more display systems, and/or any combinations thereof.

Another and/or alternative non-limiting object of the present disclosure is the provision of a shelf edge system that includes at least one support bracket that has a first connection arrangement and a second connection arrangement, wherein the at least one support bracket is connected to the shelf edge by the first connection arrangement.

Another and/or alternative non-limiting object of the present disclosure is the provision of a shelf edge system that includes a display system having a circuit board and a lighting arrangement connected to the circuit board.

Another and/or alternative non-limiting object of the present disclosure is the provision of a lighting arrangement that is adapted to emit a light in response to a signal.

Another and/or alternative non-limiting object of the present disclosure is the provision of a shelf edge system that includes a display system bracket having a connection arrangement wherein the display system is mounted to a portion of the display system bracket.

Another and/or alternative non-limiting object of the present disclosure is the provision of a connection arrangement that connects the display system bracket to the second connection arrangement of the at least one support bracket.

Another and/or alternative non-limiting object of the present disclosure is the provision of the at least one support bracket includes a connection flange having the first connection arrangement, a support flange, and an extension flange having the second connection arrangement.

Another and/or alternative non-limiting object of the present disclosure is the provision that the extension flange and the connection flange extending perpendicularly from the support flange to form a C-shape of the at least one support bracket.

Another and/or alternative non-limiting object of the present disclosure is the provision that the first connection arrangement of the at least one support bracket includes one or more magnets.

Another and/or alternative non-limiting object of the present disclosure is the provision that the second connection arrangement of the at least one support bracket and the connection arrangement of the display system bracket both comprise a ratcheting portion.

Another and/or alternative non-limiting object of the present disclosure is the provision that the shelf edge system includes at least one motion detection system connected to the circuit board.

Another and/or alternative non-limiting object of the present disclosure is the provision that the at least one motion detection system provides a signal to the lighting arrangement based on a movement detected by the at least one motion detection system.

Another and/or alternative non-limiting object of the present disclosure is the provision that the shelf edge system includes a display system housing secured to the display system bracket and adapted to cover and protect the display system.

Another and/or alternative non-limiting object of the present disclosure is the provision that the display system housing includes a generally vertically oriented wall portion and a generally horizontally oriented wall portion.

Another and/or alternative non-limiting object of the present disclosure is the provision that the display system optionally including one or more screens connected to one or more circuit boards and at least partially disposed within the generally vertically oriented wall portion of the display system housing.

Another and/or alternative non-limiting object of the present disclosure is the provision that the lighting arrangement is an LED, OLED, or the like display, and the screen is optionally eliminated.

Another and/or alternative non-limiting object of the present disclosure is the provision that the one or more screens are adapted to diffuse the light emitted by the lighting arrangement in response to the signal.

Another and/or alternative non-limiting object of the present disclosure is the provision that the shelf edge system includes a first and second U-shaped channel on the generally vertically oriented wall portion and one or more interchangeable translucent panels supported by the first and second U-shaped channels.

Another and/or alternative non-limiting object of the present disclosure is the provision that the one or more interchangeable translucent panels are located in front of the one or more screens of the display system and the one or more screens illuminate the interchangeable translucent panel.

Another and/or alternative non-limiting object of the present disclosure is the provision that the shelf edge system includes a power supply mounted to the support bracket and electronically connected to the display system.

Another and/or alternative non-limiting object of the present disclosure is the provision that the power supply includes a removable battery pack stored in an enclosure and containing one or more batteries.

Another and/or alternative non-limiting object of the present disclosure is the provision that the shelf edge system includes at least one communication device in electronic communication with the display system.

Another and/or alternative non-limiting object of the present disclosure is the provision that the at least one communication device includes one or more contacts and/or sensors adapted to communicate with an adjacent shelf edge system.

Another and/or alternative non-limiting object of the present disclosure is the provision that the at least one communication device is in wired or wireless communication with a central server.

Another and/or alternative non-limiting object of the present disclosure is the provision of a method for using a shelf edge system that includes a) providing at least one support bracket including a first connection arrangement and a second connection arrangement, the at least one support bracket being connected to the shelf edge by the first connection arrangement; a display system including a circuit board and a lighting arrangement connected to the circuit board; and a display system bracket including a connection arrangement, the display system being mounted to a portion of the display system bracket, and the connection arrangement connecting the display system bracket to the second connection arrangement of the at least one support bracket; b) detecting a movement with at least one motion detection system; c) providing a signal in response to detecting the movement with the at least one motion detection system; and d) emitting a light with the lighting arrangement in response to the signal.

Another and/or alternative non-limiting object of the present disclosure is the provision of a shelf edge system, comprising a) at least one support bracket including a connection flange, a support flange, and an extension flange, the connection flange extending perpendicularly from the support flange and including a first connection arrangement, the extension flange extending perpendicularly from the support flange and parallel to the connection flange and including a second connection arrangement; b) a display system including a lighting arrangement and at least one motion detection system connected to a circuit board, the lighting arrangement being adapted to emit a light in response to a signal generated by the at least one motion detection system; c) a display system bracket including a connection arrangement; d) a display system housing at least partially covering the display system; and e) a power supply electrically connected to the display system, and wherein the first connection arrangement of the connection flange connects the at least one support bracket to the shelf edge, the second connection arrangement of the extension flange connects to the connection arrangement of the display system bracket, the display system is mounted to a portion of the display system bracket, the display system housing is secured to the display system bracket, and the power supply is mounted to the support flange of the support bracket.

These and other objects and advantages will become apparent from the discussion of the distinction between the disclosure and the prior art and when considering the preferred embodiment shown in the accompanying drawings.

BRIEF DESCRIPTION OF THE DRAWINGS

Reference may now be made to the drawings, which illustrate various non-limiting embodiments that the disclosure may take in physical form and in certain parts and arrangement of parts wherein.

DETAILED DESCRIPTION OF NON-LIMITING EMBODIMENTS

Figure 1:
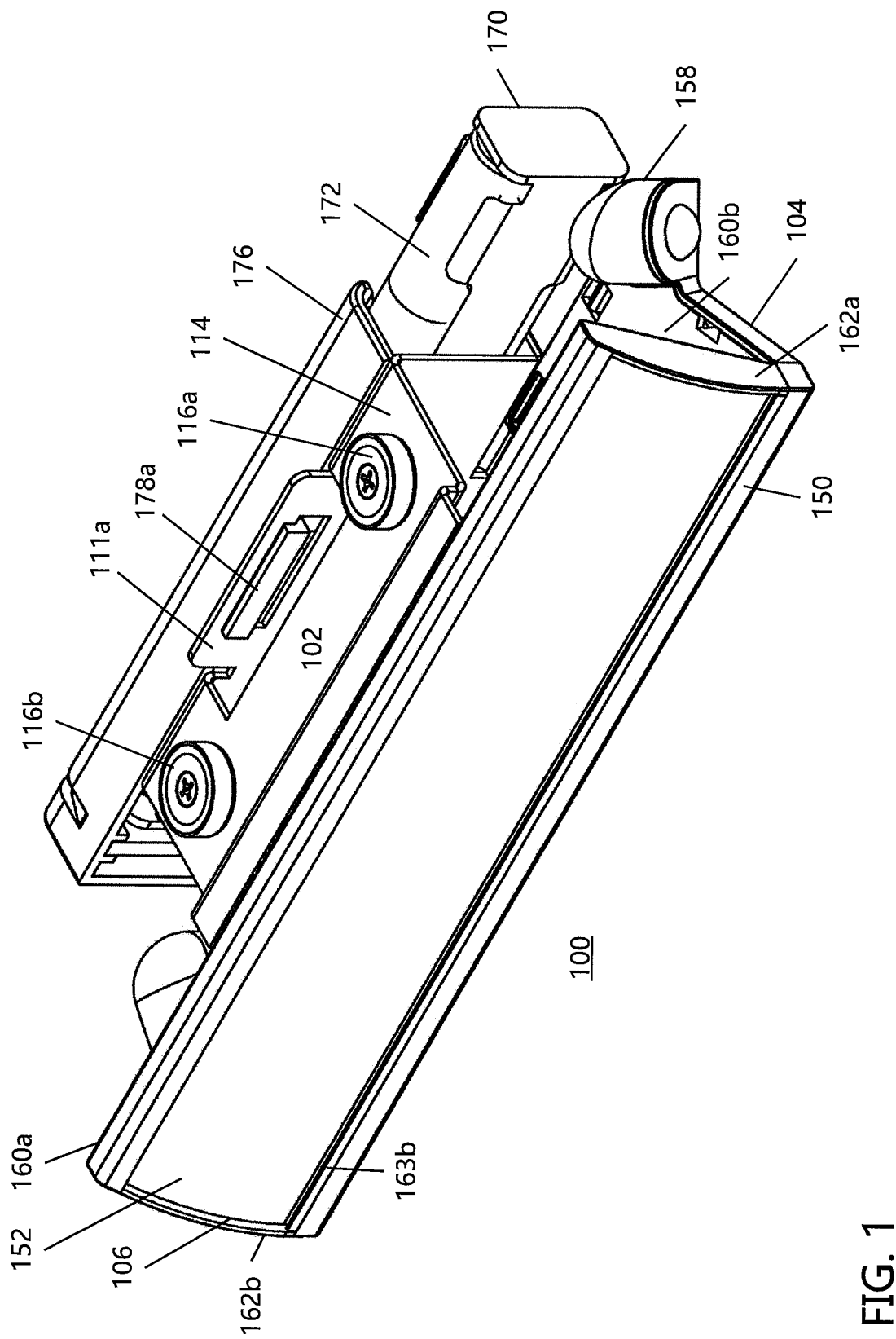
FIG. 1 is an illustration according to one non-limiting embodiment of the present disclosure showing a front elevation view of an end shelf system adapted to fit on an associated shelf.
Figure 2:
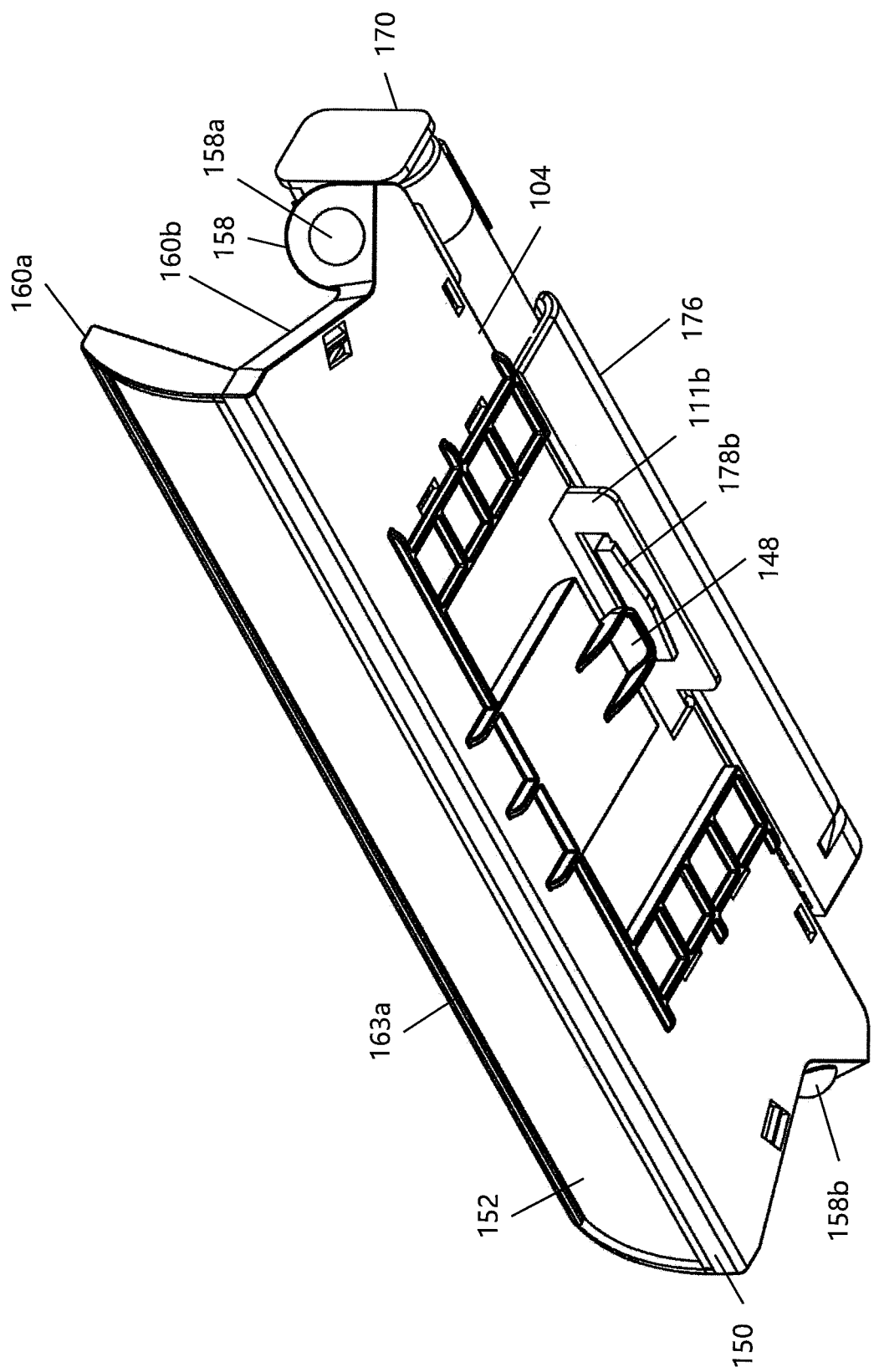
FIG. 2 is an illustration showing a bottom elevational view of the end shelf system of FIG. 1.
Figure 3:
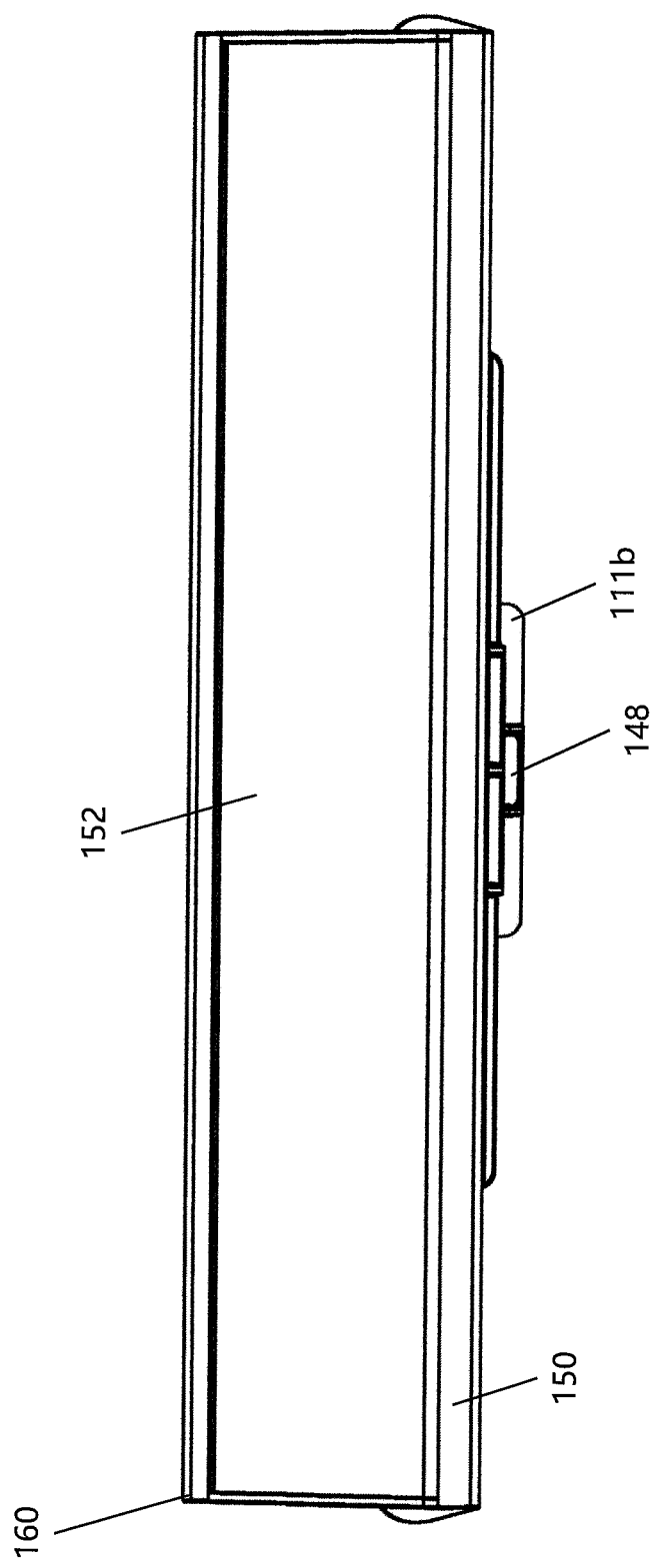
FIG. 3 is an illustration showing a front plan view of the end shelf system of FIG. 1.
Figure 4:
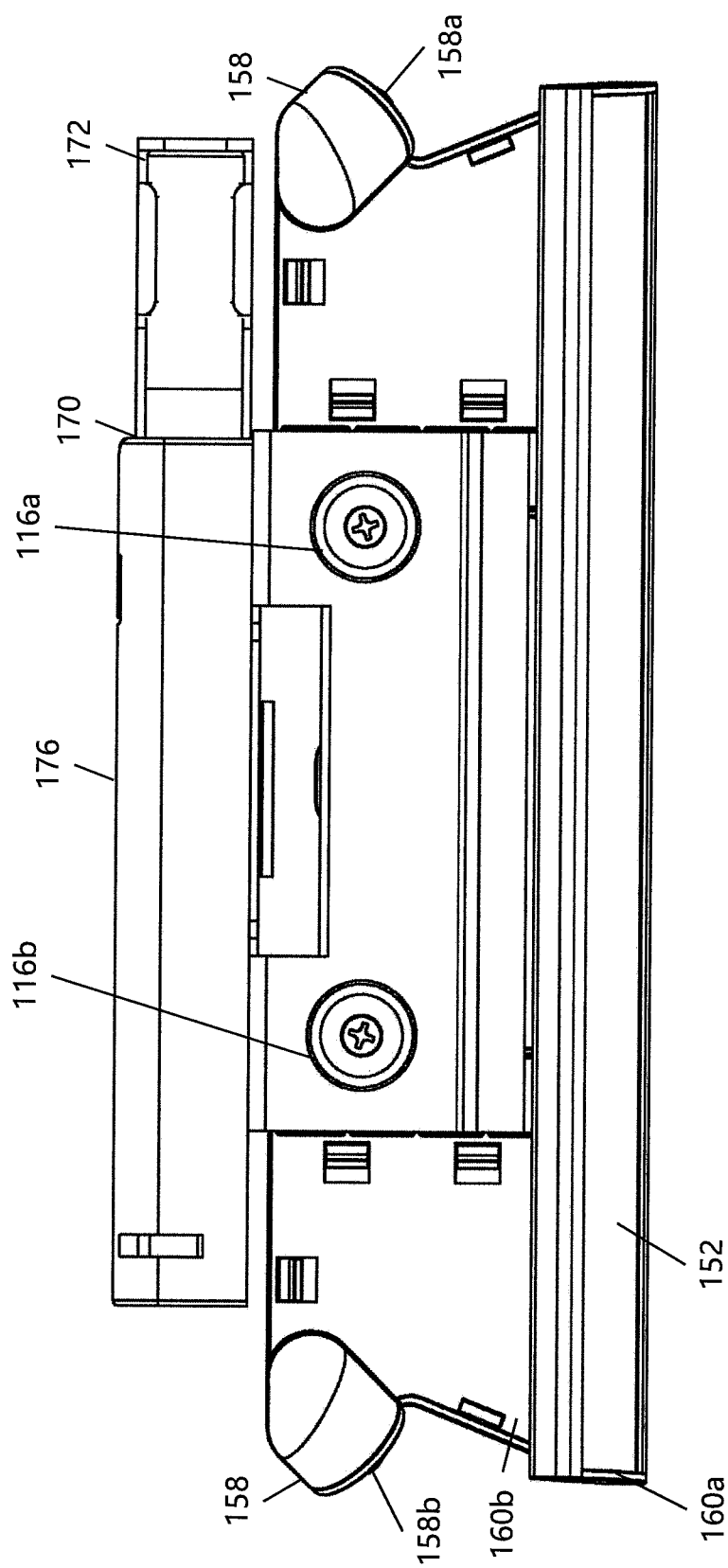
FIG. 4 is an illustration showing a top plan view of the end shelf system of FIG. 1.
Figure 5:
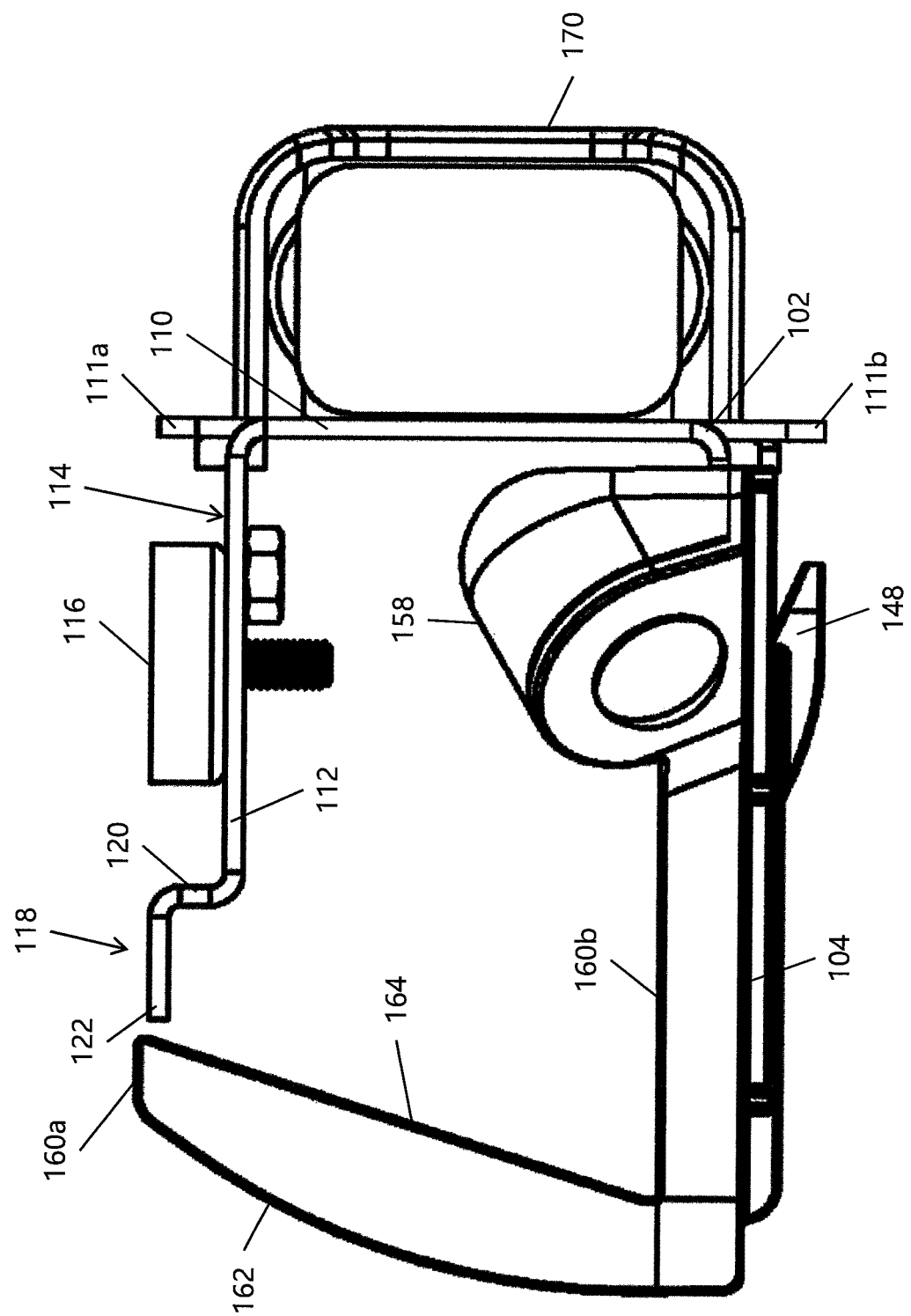
FIG. 5 is an illustration showing a side plan view of the end shelf system of FIG. 1.

Referring now to the drawings, wherein the showings are for the purpose of illustrating non-limiting embodiments of the disclosure only and not for the purpose of limiting the same, FIGS. 1-15 illustrate various non-limiting embodiments of a shelf edge system in accordance with the present disclosure. In particular, the present disclosure is directed to a shelf edge system that includes the use of a display system to attract the attention of shoppers in a store. As can be appreciated, the shelf edge system can be connected to other or alternative structures or used in other applications where an increase in attention received is desired.

In accordance with various non-limiting embodiments of the present disclosure, there is provided a shelf edge system that can be connected to a shelving unit having at least one shelf having at least one shelf edge; however, this is not required. Generally, a shelving unit includes multiple components, such as, for example, a base, a back wall extending upwardly from the base and one or more individual shelves attached approximately perpendicularly (e.g., about 80-100° [and all values and ranges therebetween]) or at some other angle to the back wall of the shelving unit. The connection arrangement connecting each individual shelf to the back wall of the shelving unit is non-limiting (e.g., bolt, screw, nail, clip, adhesive, welding, etc.). Each individual shelf generally includes an outwardly facing C-shaped channel (for example, see C-shaped channel 208 in FIG. 13) at an edge opposite the connection to the back wall of the shelving unit and providing a place for small, thin labels (e.g., paper price labels) to be attached to the shelf; however, this is not required. Each shelf also typically includes a plurality of holes and/or apertures at or near the shelf edge; however, this is not required.

Referring now to FIGS. 1-13, there is illustrated a shelf edge system 100 in accordance with one non-limiting embodiment of the present disclosure. The shelf edge system 100 generally includes at least three main components, namely a support bracket 102, a display system bracket 104, and a display system 106. Other components that can optionally be present in the shelf edge system 100 include a housing 160 adapted to protect the display system 106, and a power supply 170 for providing electricity to the display system. The entirety of each of these components is most clearly shown in FIG. 6, which illustrates and exploded assembly view of one non-limiting embodiment of the shelf edge system 100.

Figure 6:
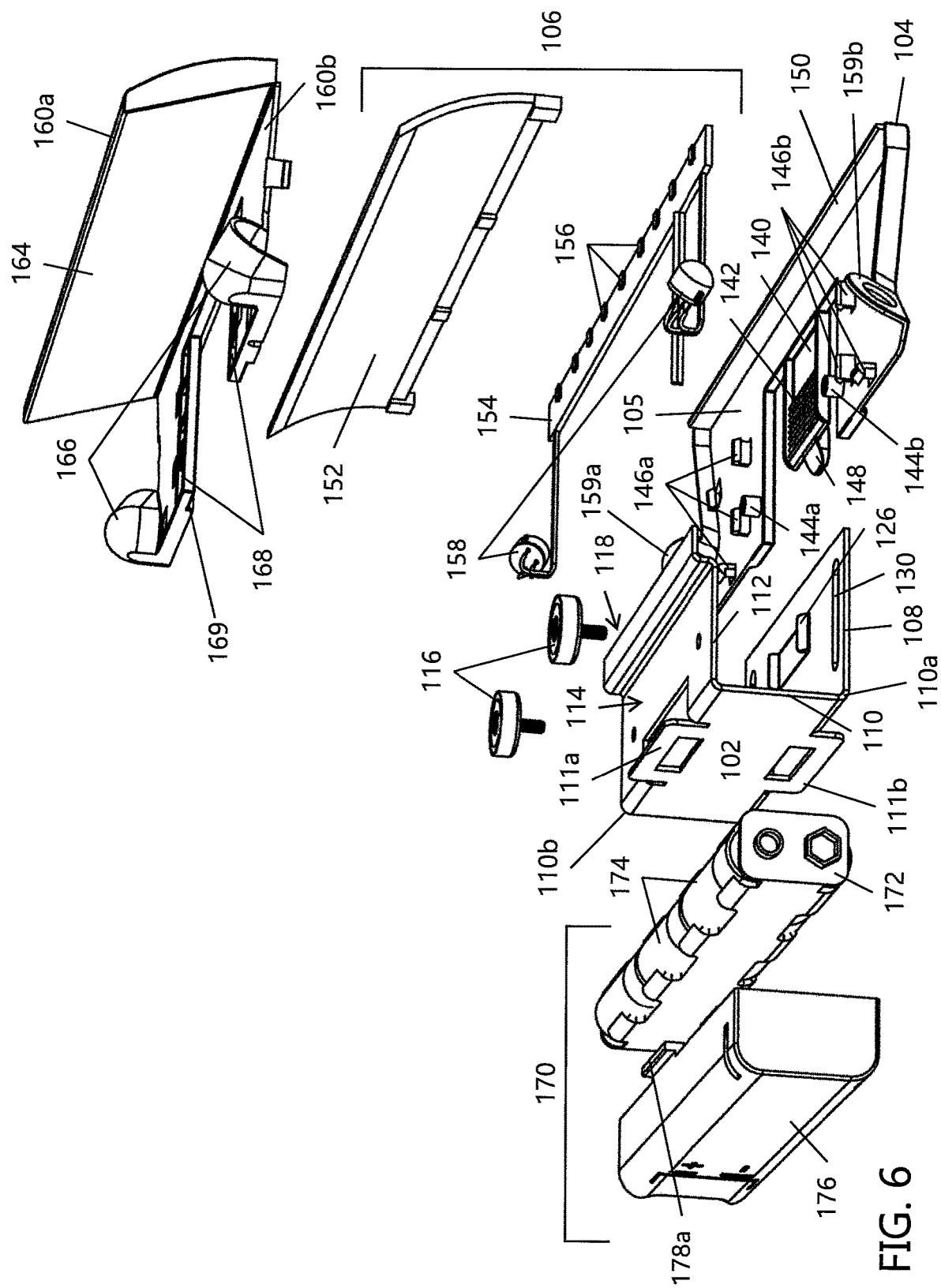
FIG. 6 is an illustration showing an exploded assembly view of the end shelf system of FIG. 1.

The support bracket 102 is not limited in shape, size or material. In one non-limiting configuration, the material used to form the support bracket is a rigid material, such as, for example, metal material (e.g., steel, aluminum, copper, etc.); however, other or alternative materials can be used if desired (e.g., plastic material, polymer material, composite material, wood, ceramic material, etc.). The support bracket 102 can include one or more flanges as illustrated in at least FIGS. 5-6, and the one or more flanges provide one or more connection arrangements between the support bracket and other components of the shelf edge system 100, such as, but not limited to, the shelf 202 and the display system bracket 104. While the support bracket 102 is generally illustrated as having a one-piece construction, such a configuration is non-limiting. For example, the support bracket 102 and its one or more flanges can optionally be formed as a multi-piece construction. Also, the shape, size and configuration of the support bracket 102 is non-limiting. As illustrated in FIG. 6, the support bracket 102 has a generally C-shaped or U-shaped configuration; however, this is not required. Generally, the one or more flanges extend rearwardly from the front face of the support bracket 102 at an angle of 70-120° (e.g., 90°) relative to the front face; however, this is not required. If the support bracket 102 includes two flanges, the flanges are generally parallel to one another; however, this is not required.

Because the support bracket 102 is not limited in size, it can be fitted to any pre-existing and/or future shelf edge as desired. In one non-limiting configuration, the height of the support bracket 102 can be from about 0.25-12 inches, more typically from about 1-8 inches, and more typically from about 1.5-6 inches. In another and/or alternative non-limiting configuration, the depth of the support bracket 102 can be from about 0.25-24 inches, typically from about 0.5-16 inches, and more typically from about 1-12 inches. Moreover, as discussed in further detail below, the support bracket 102 can be provided in sections, such as, for example, three-inch sections, six-inch sections, one-foot sections, four-foot sections, eight-foot sections, etc.

In one non-limiting configuration, the support bracket 102 contains three main elements, including an extension flange 108, a support flange 110, and a connection flange 112. In such a configuration, the extension flange 108 extends approximately perpendicularly (or at some other angle) from a first edge 110a of the support flange 110, and the connection flange 112 extends approximately perpendicularly (or at some other angle) from a second edge 110b of the support flange, the second edge being opposite the first edge. As such, the support bracket 102 is illustrated as being substantially C-shaped. As can be appreciated, other size and/or shape (e.g., U-shaped, etc.) support brackets can be used.

In one non-limiting arrangement, the connection flange 112 is generally parallel to: (i) the bottom surface of a shelf of a shelving unit (e.g., surface 206b of shelf 202 in FIG. 13), and/or (ii) the extension flange 108 when connected to the shelf of the shelving unit; however, this is not required. As briefly mentioned above, in another and/or alternative non-limiting configuration, the support bracket 102 can be formed from multiple components (not shown). For example, the support bracket can be formed from one, two, three or more components, wherein each component includes a flange of the support bracket. In such a configuration, the one, two, three or more components of the support bracket can be connected (e.g., adhesive, welding, tack welding, rivet, screw, bolt, etc.) together to provide a complete support bracket.

Figure 13:
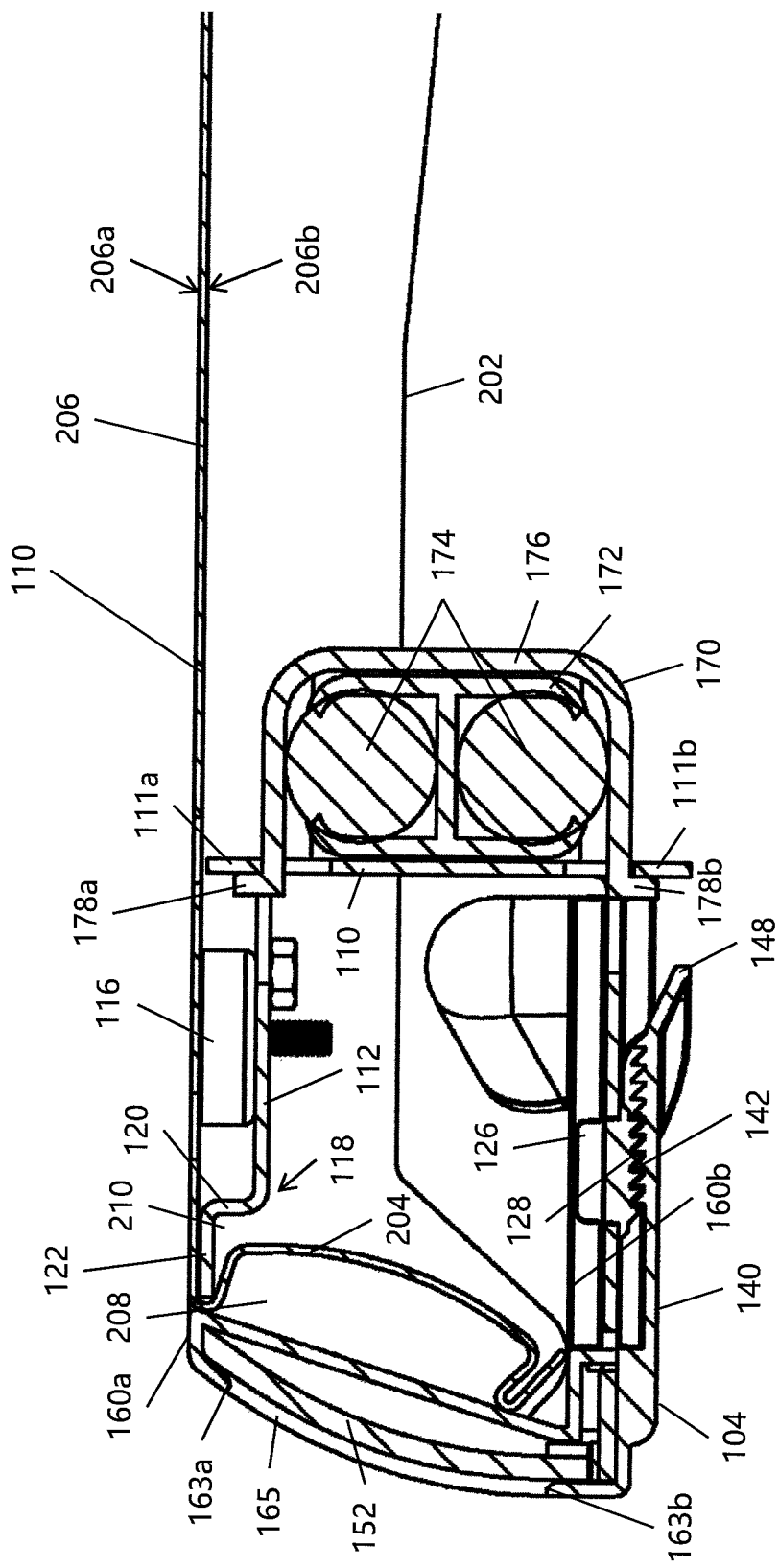
FIG. 13 is an illustration showing a cross-sectional side view of the end shelf system and associated shelf system of FIG. 9.

In another and/or alternative non-limiting aspect of the present disclosure, the connection flange 112 of the support bracket 102 is adapted to engage a bottom surface of a shelf edge at or near the back side of the C-shaped channel (e.g., bottom surface 206b of shelf 202 near the back side of C-shaped channel 208, as illustrated in FIG. 13). In this regard, the connection flange 112 can be substantially flat; however, this is not required. The connection flange can be configured such that when it is connected to the shelf, the connection flange is configured to engage at least a portion of the shelf edge; however, this is not required.

In one non-limiting configuration, the top surface 114 of the connection flange 112 provides a mounting surface to accommodate the attachment of one or more connection arrangements 116 (e.g., magnets, etc.) as illustrated in at least FIGS. 1 and 4-6. In one non-limiting arrangement, one or more magnets 116a, 116b are mounted to the top surface 114 of the connection flange 112 using an attachment means (e.g., nuts, bolts, adhesive, hook and loop fastener, screws, rivet, clamp, straps, weld bead, solder, etc.). As can be appreciated, more or fewer magnets can be used without departing from the scope of the present disclosure. As also can be appreciated, the one or more connection arrangements 116 can be attached to the top surface 114 of the connection flange 112 by any desired attachment mean. For example, an adhesive can also or alternatively be used. The magnet(s) 116 (when used) are capable of magnetically attaching the support bracket 102 to the underside of an associated shelf and supporting the weight of the support bracket 102, the weight of the display system bracket 104 connected to the support bracket, and the weight of the display system 106 connected to the display bracket. As can be appreciated, the support bracket can be connected to the shelf by other or additional means (e.g., nuts, bolts, adhesive, hook and loop fastener, screws, rivet, clamp, straps, weld bead, solder, etc.).

In another and/or alternative non-limiting configuration, the connection flange 112 can include one or more additional and/or alternative connection arrangements for engagement with the shelf end 204. For example, in one non-limiting configuration best illustrated by FIGS. 5 and 13, the connection flange 112 includes a connection end 118 adapted to engage a gap portion 210 of a C-shaped shelf end 204. In this regard, the connection end 118 of the connection flange 112 is formed with a vertical portion 120 extending approximately perpendicularly upwardly from the top surface 114 of the connection flange. A horizontal portion 122 extends approximately perpendicularly outwardly from the vertical portion 120 and approximately parallel to the surface 114. The vertical and horizontal portions 120, 122 together permit the connection end 118 of the connection flange 112 to engage the gap portion 210 of the C-shaped shelf end 204 and help hold the support bracket 102 close to surface 206b of the shelf 202. As can be appreciated, other or alternative configurations of the connection end can be used without departing from the scope of the present disclosure. In one non-limiting arrangement, the connection end 118 and the one or more magnets 116a, 116b are used to connect the support bracket 102 to the bottom side of an associated shelf at or near the shelf edge. As can be appreciated, the connection flange can include other or alternative shapes and/or configurations, and the particular size, shape or material of the connection flange is non-limiting.

In another and/or alternative non-limiting aspect of the present disclosure, the extension flange 108 of the support bracket 102 is generally adapted to be positioned approximately parallel (or at some other angle) to: (i) the shelf surface of a shelving unit (such as surface 206a of shelf 206 illustrated in FIG. 13), and/or (ii) the connection flange 112 of the support bracket. In one non-limiting arrangement, the extension flange 108 of the support bracket 102 is configured to be positioned a distance (e.g., about 0.01-2 inches, 0.5 inches, etc.) from the bottom of the price channel or shelf edge/end 204.

The extension flange 108 is configured to engage at least a portion of the display system bracket 104 using any desired engagement mechanism (e.g., friction engagement, clamp engagement, snap engagement, tongue and groove engagement). In this regard, the extension flange 108 generally extends from the first end 110a of the support flange 110 to connect to the display system bracket 104 using a connection arrangement portion 126. The particular connection arrangement used is non-limiting and may include, for example, a ratcheting system and/or indexing system as illustrated in FIGS. 6 and 13. In one non-limiting configuration, a portion 126 of the extension flange 108 includes a ratcheting section 128, as best shown in FIG. 13. The ratcheting section 128 is made of one or more surface projections (e.g., bumps, ridges, grooves, etc.). In one non-limiting configuration, the ratcheting portion 128 of the extension flange 108 is provided across about 2-100% (and all values and ranges therebetween) of the extension flange, more typically from about 10-90%, and more typically from about 20-60%. In some configurations, the connection arrangement portion 126 can be provided as a separate insert that fits within a portion of the extension flange 108 to provide the ratcheting portion 128. In such a configuration, the connection arrangement portion 126 can be attached to the extension flange 108 by any desired means (e.g., snap fit).

The extension flange 108 can include one or more holes, cutouts, windows and/or apertures, etc., such as elongated cutout 130. The extension flange 108 can include about 1-30 holes (and all ranges or values therebetween), more typically about 1-20 holes, and more typically about 1-10. The size and shape of the holes in the extension flange is non-limiting. The cutouts (such as elongated cutout 130) on the extension flange 108 are generally adapted to facilitate the securing of the extension flange, and thus the support bracket 102, in position to a portion of the display system bracket 104.

The display system bracket 104 is not limited in shape, size or material. In one non-limiting configuration, the material used to form the display system bracket 104 is a rigid material such as, for example, metal material (e.g., steel, aluminum, copper, etc.); however, other or alternative materials can be used (e.g., plastic material, polymer material, composite material, wood, ceramic material, etc.). In one non-limiting arrangement, the material of the display system bracket 104 is the same as the support bracket 102; however, this is not required.

In one non-limiting configuration, the display system bracket 104 is generally flat and has a mounting surface 105 adapted to accommodate the attachment of one or more components of the display system 106 and/or support bracket 102. In this regard, the mounting surface 105 can generally include one or more flanges, panels, retaining walls, mounting features, etc., which generally extend upwardly perpendicularly from the mounting surface or extend outwardly from the mounting surface, to provide attachment options for the display system 106 and/or support bracket 102. In one non-limiting arrangement, the mounting surface 105 of the display system bracket 104 includes an extension panel 140 generally positioned parallel (or at some other angle) to: (i) the shelf surface of the shelving unit (e.g., surface 206a of shelf 202 illustrated in FIG. 13), (ii) the extension flange 108 of the support bracket 102, and/or (iii) the connection flange 112 of the support bracket.

The extension panel 140 is adapted to engage (e.g., frictionally) at least a portion of the support bracket 102. In one non-limiting arrangement, the extension panel 140 of the display system bracket 104 includes a connection arrangement portion 142 having a configuration corresponding to the connection arrangement of the extension flange 108 of the support bracket 102. As such, the connection arrangement 142 of the extension panel 140 of the display system bracket 104 is a ratcheting system. In other words, the ratcheting connection arrangement 142 of the extension panel 140 is made of one or more surface projections (e.g., bumps, ridges, grooves, etc.) adapted to engage with the surface projections of the ratcheting portion 128 on the extension flange 108 of the support bracket 102. The size and shape of the surface projections on both ratcheting portions 128 and 142 is non-limiting. The ratcheting portions advantageously facilitate in securing the display system bracket 104 in position with respect to the support bracket 102. Furthermore, the ratcheting portions can: (i) facilitate the incremental tightening of the display system bracket 104 relative to the support bracket 102, thereby ensuring sufficient hold of the shelf edge system on the shelf end, (ii) facilitate attachment to different size shelf edges and/or price channels (i.e. C-shaped channels or shelf edge/end 204), and/or (iii) prevent tampering of the shelf edge system when installed on a shelf end.

In another non-limiting arrangement, the mounting surface 105 of the display system bracket 104 includes one or more pylons, such as pylons 144a and 144b, which generally extend upwardly from the mounting surface. The one or more pylons 144a and 144b are disposed in a configuration that corresponds to the arrangement of the one or more holes, cutouts, windows and/or apertures, etc., such as elongated cutouts 130, of the extension flange 108. In this regard, the one or more pylons 144a and 144b are generally adapted to fit within the elongated cutouts 130 of the extension flange 108, thereby facilitating the securing of the support bracket 102 to the display system bracket 104. In addition, the mating of the one or more pylons 144a, 144b with the elongated cutouts 130 provides a track to guide the engagement between the support bracket 102 and display system bracket 104 and also limits the amount of movement of the display system bracket 104 relative to the support bracket 102.

In an additional non-limiting arrangement, the mounting surface 105 of the display system bracket 104 includes one or more attachment mechanisms, such as posts 146a and 146b, which generally extend upwardly from the mounting surface. The one or more posts 146a, 146b are disposed in a configuration that corresponds to the arrangement of one or more holes, cutouts, windows and/or apertures, etc., such as apertures 168, of the display system housing 160. In this regard, the one or more posts 146a, 146b are generally adapted to provide engagement (e.g., friction engagement, clamp engagement, snap engagement, tongue and groove engagement) with a corresponding aperture 168, thereby facilitating the securing of the display system bracket 104 to the display system housing 160. As can be appreciated, the display system bracket 104 can be connected to the display system housing 160 by other or additional means (e.g., nuts, bolts, adhesive, hook and loop fastener, screws, rivet, clamp, straps, weld bead, solder, etc.).

In still a further non-limiting arrangement, the mounting surface 105 of the display system bracket 104 can include a retaining wall 150, which generally extends upwardly from the mounting surface at an outer edge and around a portion or substantially the entire periphery thereof. The retaining wall 150 is generally adapted to provide abutment with a corresponding surface of the display system 106 and/or the display system housing 160, thereby facilitating the securing of the display system bracket 104 to the display system and/or the display system housing.

In another and/or alternative non-limiting arrangement, a tab 148 is provided on the extension panel 140 of the display system bracket 104, generally adjacent to the ratcheting portion 142 and oriented toward the extension flange 108 of the support bracket 102. The tab 148 includes a portion that generally slopes downwardly with respect to the mounting surface 105 of the display system bracket 104, however the size, shape and material of the tab are non-limiting. The tab 148 can be formed in a one-piece construction with the extension panel 140 or attached thereto using any suitable attachment means. As such, when the tab 148 (and therefore the extension panel 140 and ratcheting portion 142) is caused to move downwardly, the surface projections of the ratcheting portion are disengaged from the corresponding surface projections of the ratcheting portion 128 on the extension flange 108 of the support bracket 102 (see FIG. 13). Thus, the display system bracket 104 can easily and conveniently move fore and aft (or be removed) with respect to the support bracket 102. For example, by disengaging the surface projections of the ratcheting portions 142 and 128 via tab 148, the display system bracket 104 can move along the track provided by the mating of the one or more pylons 144a, 144b on the mounting surface 105 with the elongated cutouts 130 of the extension flange 108.

The display system bracket 104 is not limited in size. As such, the display system bracket can be fitted to any pre-existing and/or future shelf edge as desired. In one non-limiting configuration, the height of the display system bracket can be from about 0.25-12 inches, more typically from about 1 inch to about 6 inches, and more typically from about 1.5-4 inches. In another and/or alternative non-limiting configuration, the depth of the display system bracket can be from about 0.25-24 inches, typically from about 0.5-16 inches, and more typically from about 1-12 inches.

The display system bracket can be provided in sections, such as, for example, four-inch long sections, one-foot long sections, four-foot long sections, eight-foot long sections, etc.; however, this is not required.

In one non-limiting configuration, the display system 106 generally has at least two main components, including a light diffuser screen 152 and a circuit board or printed circuit board (PCB) 154 for mechanically supporting and electrically connecting various electronic components that may be included in the shelf edge system 100. As can be appreciated, the screen can be substituted for a LED, OLED, or the like display. Exemplary electronic components that may be included with the shelf edge system 100 include but are not limited to a light system (e.g., one, two, three or more light emitting diodes (LEDs) 156, LED screen, OLED screen, etc.) and/or at least one motion detection system 158 having one or more motion detectors 158*a*, 158*b*. As can be appreciated, if the lighting system includes a LED screen, OLED screen or the like, the screen 152 can be eliminated.

The screen 152, when used, is adapted to be attached to the mounting surface 105 of the display system bracket 104, such that the screen is generally disposed behind the retaining wall 150 and within at least a portion of the display system housing 160. The circuit board 154 is also adapted to be attached to the mounting surface 105 of the display system bracket 104; however, this is not required. In this regard, the display system bracket 104 can optionally include support walls 159*a*, 159*b* adapted to position and support the one or more motion detectors 158*a*, 158*b* of the at least one motion detection system 158. When attached to the mounting surface 105, the circuit board is generally disposed behind the screen 152 with at least the portion of the circuit board having the LEDs 156 being disposed under the screen. In such an arrangement, regarding the LEDs 156, the curved translucent screen 152 is adapted to diffuse and evenly spread the light emitted from the LEDs on the circuit board 154, thereby illuminating the screen. As can be appreciated, other types of lighting arrangements can be used (e.g., halogen lights, incandescent lights, florescent lights, chemical lights, etc.) without departing from the scope of the present disclosure.

The at least one motion detection system 158 can be connected to the circuit board such that the one or more motion detectors 158*a*, 158*b* are located behind the LEDs 156; however, this is not required. Moreover, at least a portion of the display system housing 160 is adapted to cover the circuit board 154 and the at least one motion detection system 158; however, this is not required.

The one or more motion sensors 158*a*, 158*b* of the at least one motion detection system 158 are not limited in size, shape or type. The shelf edge system 100 can include one, two, three or more motion sensors. In one non-limiting arrangement, the shelf edge system 100 has a single motion sensor 158*a*, 158*b* at each end of the shelf edge system, each motion sensor configured to detect shopper actions (e.g., walking towards, walking near, walking away from, browsing the shelf, etc.) at or near the shelf edge system. Typically, the motion sensors are configured to detect movement up to a distance of about 6 feet to about 15 feet from the motion sensor; however, other or alternative distances can be used. In one non-limiting arrangement, when a shopper is detected by the at least one motion detection system 158, the motion detection system can signal the LEDs 156 to light-up, causing the screen 152 of the shelf edge system to illuminate; or alternatively cause a LED or OLED display to display some type of information on the display. As can be appreciated, the motion detection system can signal the shelf edge system to initiate other actions (e.g., flash, dim, produce sounds, play a video, print coupon, play a prerecorded message, etc.). One non-limiting advantage of a shelf edge system having the presently described at least one motion detection system 158 is that the motion detection system provides a balance of beneficial characteristics, including but not limited to: (i) detecting whether a shopper is present at or near the shelf edge system, and/or (ii) illuminating only when a shopper is present at or near the shelf edge system, thereby saving electricity and, therefore, money. As such, the at least one motion detection system 158 provides a shelf edge system which is capable of illuminating when a shopper is present at or near a display in a store, and which is capable of dimming or switching off when a shopper is determined to not be present at or near the display.

The display system housing 160 is not limited in shape, size or material. In one non-limiting configuration, the material used to form the display system housing 160 is a rigid material such as, for example, metal material (e.g., steel, aluminum, copper, etc.); however, other or alternative materials can be used (e.g., plastic material, polymer material, composite material, wood, ceramic material, etc.). In one non-limiting arrangement, the material of the display system housing 160 is the same as the support bracket 102 and the display system bracket 104. However, materials can be different with departing from the scope of the present disclosure.

In one non-limiting arrangement, the display system housing 160 can include a generally vertically oriented wall portion 160*a* and a generally horizontally oriented wall portion 160*b*. In one non-limiting configuration, vertically oriented wall portion 160*a* can extend at an angle (i.e. about 10-170°) from an edge of the horizontally oriented wall portion 160*b*; however, this is not required. As such, the display system housing 160 has a substantially L-shaped side profile; however, such a shape is not required. As can be appreciated, other size and/or shape (e.g., V-shape, etc.) the display system housing 160 can be used.

In such arrangements including a vertically and horizontally oriented wall portion, the screen 152 of the display system 106 is at least partially disposed within the vertically oriented wall portion 160*a*, such that the vertically oriented wall portion can cover, protect, and/or house the screen within at least a portion thereof. In this regard, the vertically oriented wall portion 160*a* includes arcuate sidewalls 162*a*, 162*b* disposed adjacent each side of the screen when the screen is housed within the vertically oriented wall portion. Moreover, the vertically oriented wall portion 160*a* includes a back wall 164 adapted to support the screen 152. As can be appreciated, when the screen is a LED or OLED display or the like display, a similar or different arrangement can be used to secure the LED or OLED display or the like display to the display system housing 160.

In another and/or alternative non-limiting aspect of the display system housing 160, the vertically oriented wall portion 160*a* can include a first and second U-shaped channels 163*a*, 163*b*. The first U-shaped channel 163*a* is generally located adjacent an upper portion of the vertically oriented wall portion 160*a* and is oriented downward. The second U-shaped channel 163*b* is generally located adjacent an opposing lower portion of the vertically oriented wall portion 160 and is oriented upward. The first and second U-shaped channels 163*a*, 163*b* are adapted to hold a replaceable and/or interchangeable film or acrylic panel 165 therein such that the film is located in front of the screen 152, as best shown in FIG. 13. The replaceable and/or interchangeable film 165 can be formed from any translucent and/or semitranslucent material which can optionally include print, graphics, verbiage, etc. thereon. The type of acrylic panel used is non-limiting. In one non-limiting arrangement, the acrylic component is a substantially flat (e.g., no curved surface) piece of acrylic material; however, this is not required. The acrylic panel can be etched on the rear surface thereof, and backed with a white vinyl; however, this is not required. The acrylic panel can include one or more designs on a front surface thereof; however, this is not required. As can be appreciated, other and/or alternative panels can be used. Additionally, the replaceable and/or interchangeable film 165 can include information (e.g., brand name information, price information, discount information, size information, nutrition information, related products information, etc.) about an associated product; however, this is not required. Generally, the transparency of the replaceable and/or interchangeable film is selected so as to permit the film to appear to light up from behind. For example, when the at least one motion detection system 158 detects motion and causes the LEDs 156 to illuminate, and screen 152 diffuses the light and permits the film 165 to appear to light up from behind. In other words, the screen 152 provides backlight to the film 165.

In another and/or alternative non-limiting aspect of the display system housing 160, the vertically oriented wall portion 160a can still cover, protect, and/or house the screen 152, however, instead of including an interchangeable translucent panel 165, the screen itself is can be an electronic visual display (not shown). In such an arrangement, the electronic visual display can present images, text, or video without having to use an interchangeable translucent panel. That is, the electronic display can be provided with or in place of the lighting arrangement 156, such that the electronic display can be considered a lighting arrangement capable of emitting light in the form of a lighted visual display. The type of electronic visual display used is non-limiting, however, some examples include but are not limited to liquid crystal displays (LCDs), light emitting diode displays (LED), organic light emitting diode displays (OLED), etc. In embodiments utilizing an electronic visual display, when the at least one motion detection system 158 detects motion, it can similarly signal the visual display to turn on and display any desired print, graphics, video, verbiage, and/or information (e.g., brand name information, price information, discount information, size information, nutrition information, related products information, etc.) about an associated product, etc.

In another and/or alternative non-limiting aspect of the display system housing 160, the horizontally oriented wall portion 160b is generally shaped and dimensioned to have an outer periphery that is substantially similar to the outer periphery of the display system bracket 104. In this regard, the horizontally oriented wall portion 160b is adapted to cover and/or protect any component of the shelf edge system 100 that may be disposed on the mounting surface 105 of the display system bracket 104, such as the circuit board 154 and LEDs 156. Moreover, the horizontally oriented wall portion 160b includes one or more motion detector housings 166. The one or more motion detector housings 166 are adapted to cover and/protect the one or more motion detectors 158a, 158b of the at least one motion detection system 158. The horizontally oriented wall portion 160b also includes one or more apertures 168 disposed in a configuration that corresponds to the arrangement of the one or more posts 146a, 146b of the display system bracket 104. As mentioned above, the one or more posts 146a, 146b are generally adapted to provide engagement (e.g., friction engagement, clamp engagement, snap engagement, tongue and groove engagement) with one of the corresponding apertures 168, thereby facilitating the securing of the display system bracket 104 to the horizontally oriented wall portion 160b of the display system housing 160.

The base of the display system housing 160 includes two upper cut portions 169 that form a slot when the display system housing 160 is connected to the display system bracket 104. The slot is configured to receive a portion of extension flange 108 of the support bracket when the display system and display system housing are connected to the support bracket.

In another and/or alternative non-limiting aspect of the present disclosure, a single power supply 170 can be used to provide power to the shelf edge system 100. As can be appreciated, more than one power supply can be used without departing from the scope of the present disclosure. The power supply 170 can be connected via one or more wires to the display system 106 (e.g., the circuit board 154, LEDs 156, motion detection system(s) 158, communication device(s) 180, etc.) such that the display system can be driven by the power supply connected to the wires. In another and/or alternative non-limiting arrangement, the power can be split to one or more transformers. Optionally, one transformer can be provided for each panel of the shelf edge system. Power can be supplied by any external power source (wall plug, etc.); however, this is not required.

As can be appreciated, other or alternative power sources can be used. For example, in the non-limiting embodiments illustrated in FIGS. 1-13, the power supply 170 can optionally include a battery pack 172 containing one or more batteries 174, as well as an enclosure 176 to protect and/or contain the battery pack. The battery pack 172 can be stored within the enclosure 176, such that the battery pack can easily be removed to replace dead/depleted batteries. In such an arrangement, the power supply 170 can be attached to the rear of the support flange 110 of the support bracket 102; however, such a location is non-limiting. When configured as such, the support flange 110 can include a first attachment tab 111a and a second attachment tab 111b, each including an aperture. The apertures of first and second attachment tabs 111a, 111b are adapted to receive a first attachment flange 178a and a second attachment flange 178b disposed on the battery enclosure 176, such that the power supply 170 is concealed from the aisle. The first and second attachment flanges 178a, 178b can be approximately centrally located on an upper and lower distal edge of the battery enclosure 176; however, this location is only exemplary. When force is applied to both the upper and lower portions of the battery closure 176, the first and second attachment flanges 178a, 178b are able to flex downward and permit the removal and/or insertion of one of the flanges into or out of the corresponding aperture of either the first or second attachment tabs 111a, 111b. A hinge-like motion can then be used to remove or insert the remaining attachment flange.

Figure 7:
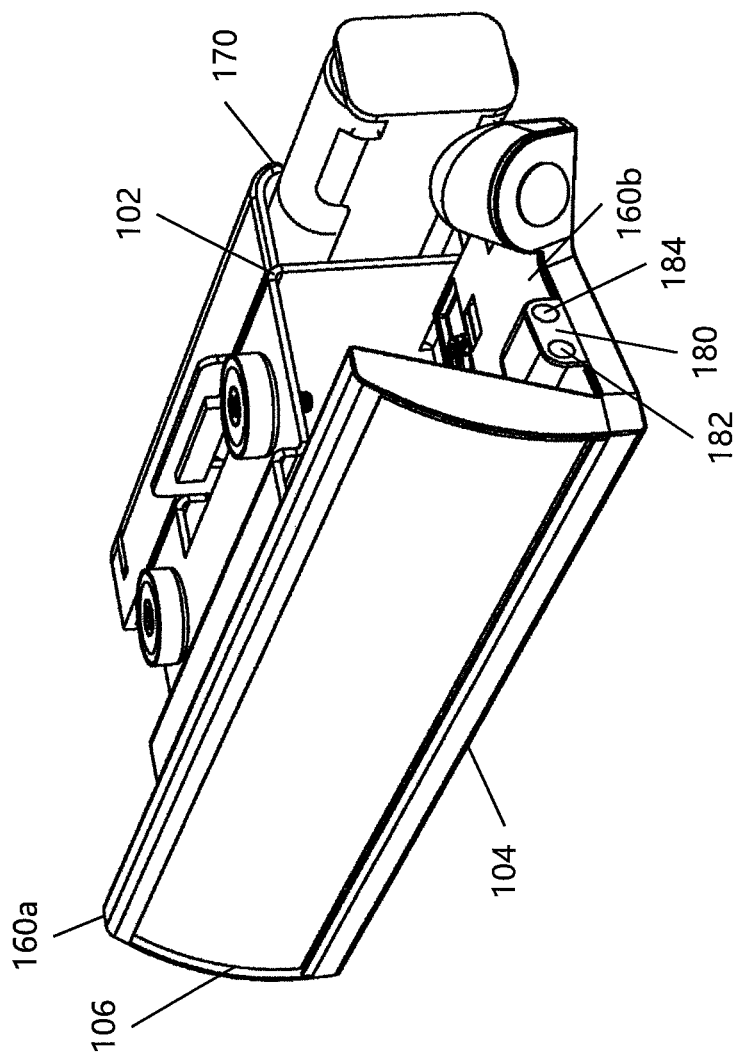
FIG. 7 is an illustration showing a front elevation view of the end shelf system of FIG. 1 and including at least one communication device.
Figure 8:
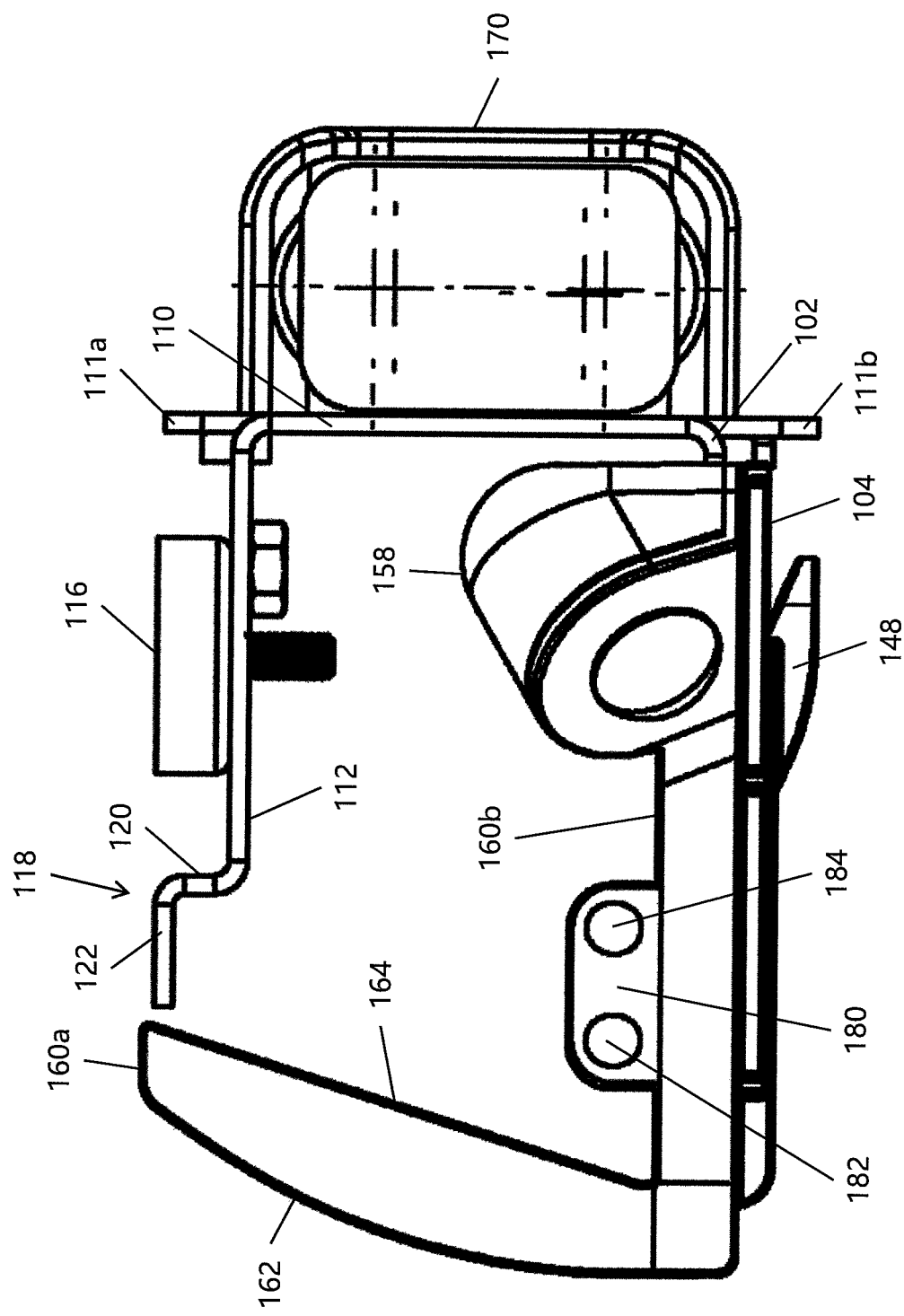
FIG. 8 is an illustration showing a side plan view of the end shelf system of FIG. 7.
Figure 9:
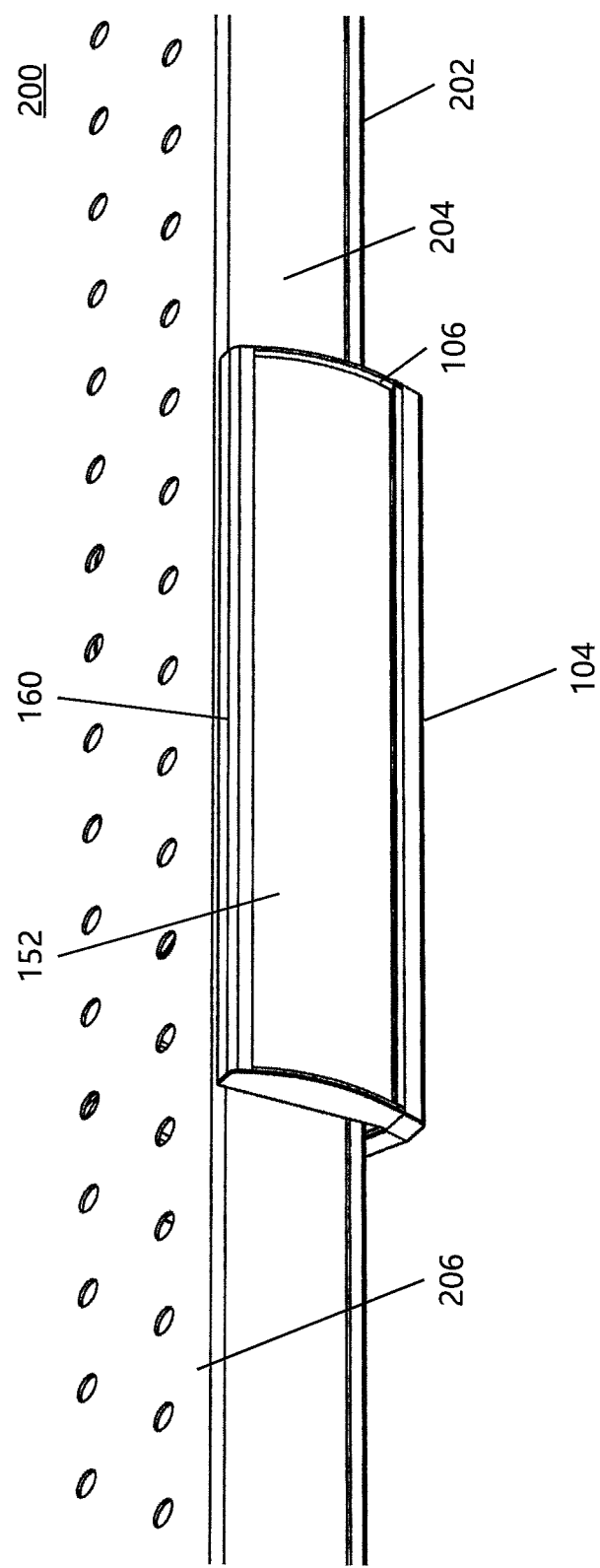
FIG. 9 is an illustration showing a front elevation view of the end shelf system of FIG. 1 being attached to an associated shelf system.
Figure 10:
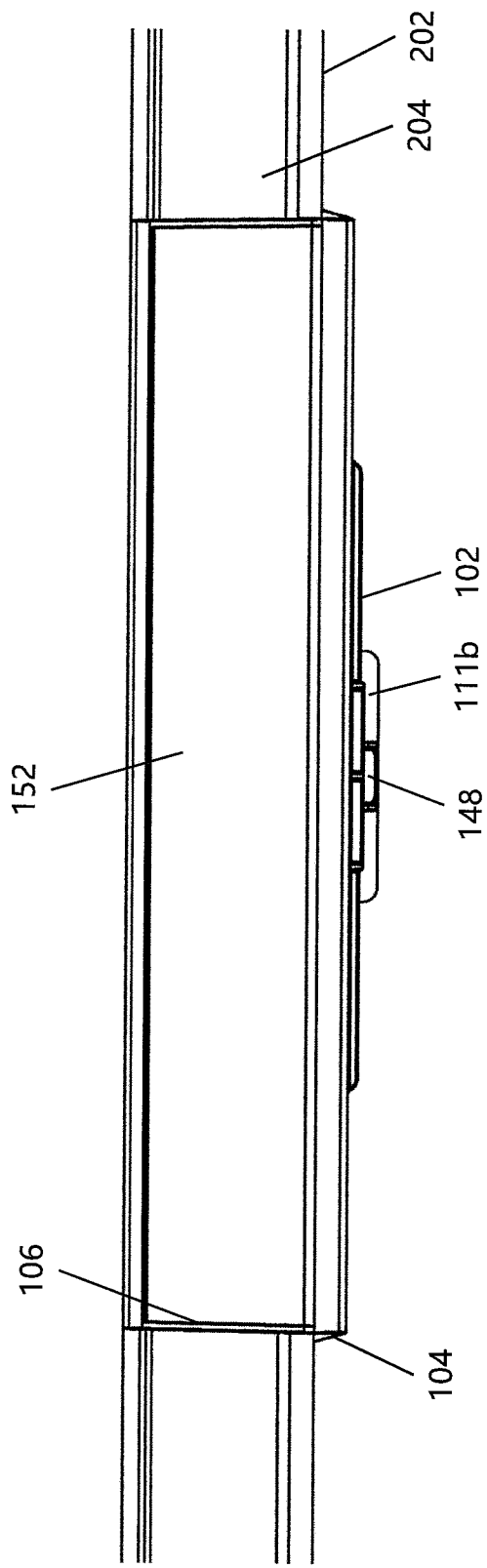
FIG. 10 is an illustration showing a front plan view of the end shelf system and associated shelf system of FIG. 9.
Figure 11:
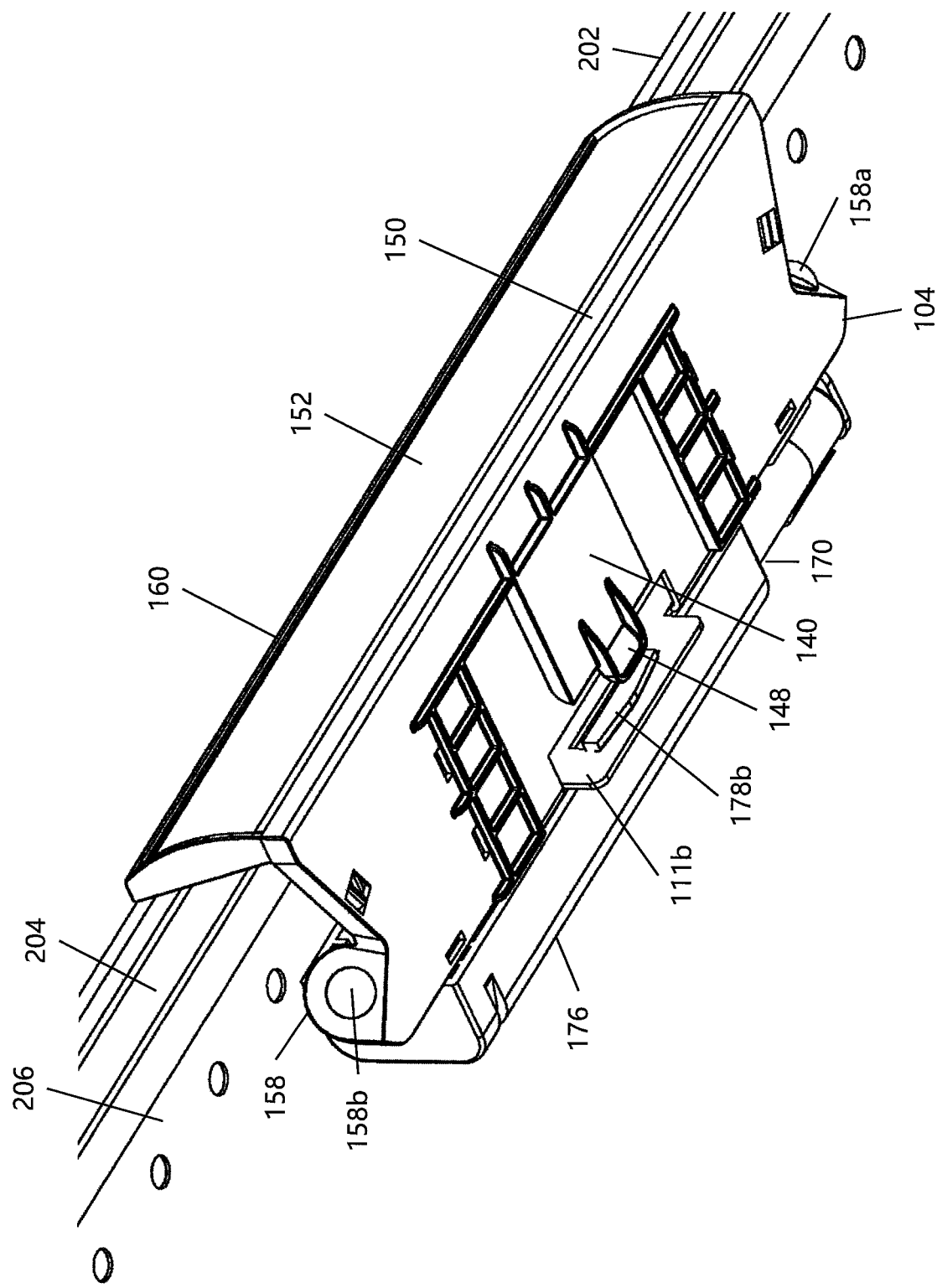
FIG. 11 is an illustration showing a bottom elevation view of the end shelf system and associated shelf system of FIG. 9.
Figure 12:
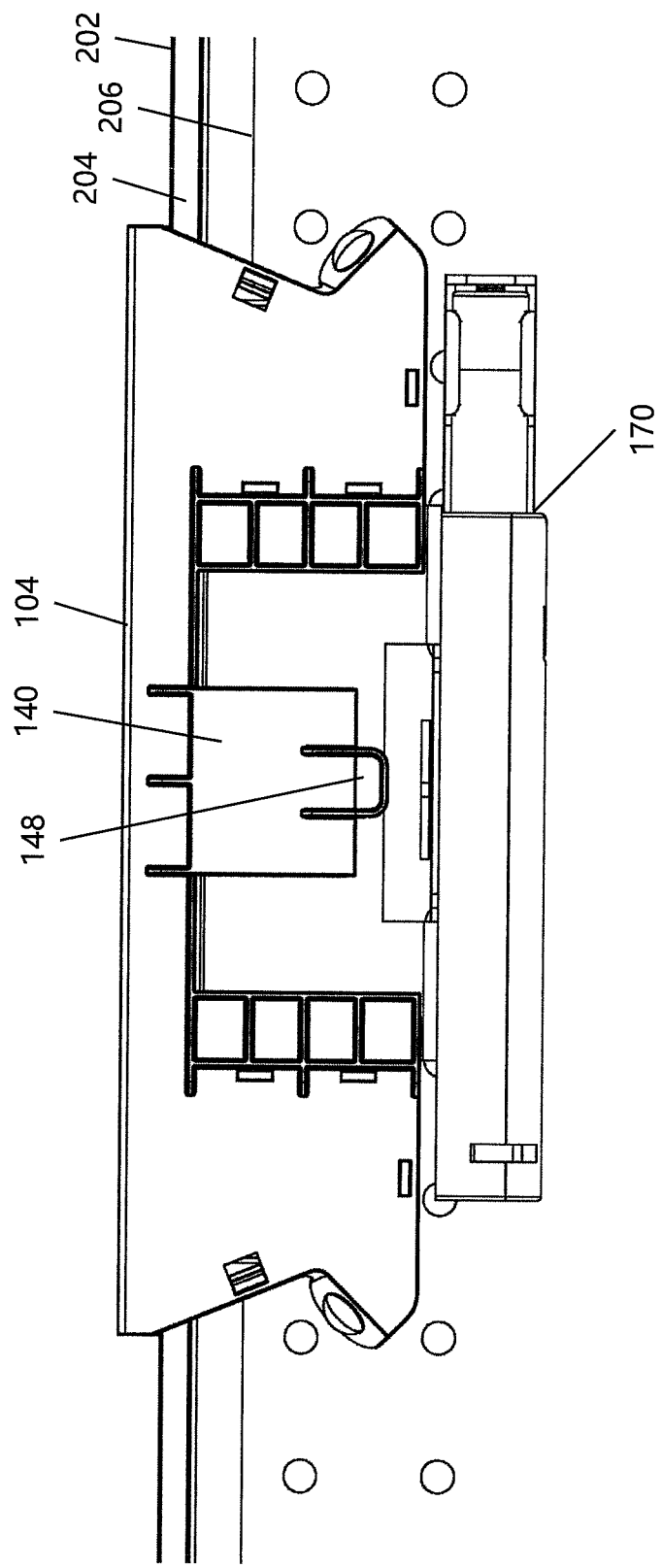
FIG. 12 is an illustration showing a bottom plan view of the end shelf system and associated shelf system of FIG. 9.

In another and/or alternative non-limiting aspect of the present disclosure, the shelf edge system 100 can optionally include at least one communication device 180 as illustrated in FIGS. 7 and 8. The at least one communication device 180 can be disposed on at least a portion of the display system housing 160; however, such a location is only exemplary and non-limiting. Moreover, the at least one communication device can be in electronic communication with the display system 106 to interact therewith. In this regard, the at least one communication device 180 can be connected to the circuit board 154 and the power supply 170. Alternatively, the communication device can operate as a stand-alone device with its own power source. The at least one communication device 180 can include one or more contacts or sensors/transmitters 182, 184 adapted to connect and/or communicate with adjacent, side-by-side, and/or neighboring shelf edge systems together, such that the connected shelf edge systems can communicate; however this is not required. The one or more contacts or sensors/transmitters 182, 184 are not limited in size, shape or material. The at least one communication device 180 of the shelf edge system can include one, two, three or more contacts or sensors/transmitters. In one non-limiting arrangement, the shelf edge system has at least one communication device 180 at one or both ends of the shelf edge system, communication device(s) including at least one contact or sensors/transmitters 182, 184 wherein each is configured to connect and/or communicate (i.e., physically and/or electronically) with a neighboring shelf edge system.

In another and/or alternative non-limiting arrangement, each end of the shelf edge system has a communication device 180 including a first contact or sensor/transmitter 182 and a second contact or sensor/transmitter 184. In one non-limiting arrangement, the first contact or sensor/transmitter is a positive polarity contact and the second contact or sensor/transmitter is a negative polarity contact. In operation, the positive polarity contact is adapted to be attractive towards the negative polarity contact of a neighboring shelf edge system, and the negative polarity contact is adapted to be attractive towards the positive polarity contact of the neighboring shelf edge system. As can be appreciated, other and/or alternative connection arrangements can be used without departing from the scope of the present disclosure.

One non-limiting advantage of a shelf edge system 100 having the presently described communication devices 180 is that the communication devices provide a balance of beneficial characteristics including but not limited to: (i) allowing neighboring shelf edge systems to communicate with each other, and/or (ii) illuminating neighboring shelf edge systems sequentially, in unison or some other combination so as to attract the attention to of a shopper at or near a shelf in a store. As such, the one or more communication devices 180 provide a shelf edge system which is capable of communicating with neighboring shelf edge systems.

As can be appreciated, the one or more communication devices 180 of the shelf edge system 100 can be adapted to also or alternatively electronically communicate with neighboring shelf edge systems wirelessly (e.g., IR communication, RF communication, Bluetooth® communication, wireless internet communication, etc.). In addition, or alternatively, the one or more communication devices 180 can also electronically communicate with a central location, server, etc., either via wired connection (e.g., ethernet) or wirelessly (e.g., IR communication, RF communication, Bluetooth® communication, wireless internet communication, etc.). One non-limiting advantage of a shelf edge system 100 having one or more communication devices 180 capable of communicating with a central location, is that the communication devices provide a balance of beneficial characteristics including but not limited to: 1) controlling of the LEDs remotely to illuminate shelf edge systems in unison or some other combination so as to attract the attention of a shopper at or near a shelf in a store, 2) electronically sending information from the shelf edge system to a remote location to provide various type of tracking information, information about how often the display is activated, error information about the shelf edge system, power level information of the shelf edge system, number of coupons printed, printer paper levels, ink levels, display error, lighting errors, etc., and/or 3) electronically sending information from a remote location to the shelf edge system to provide information to the shelf edge system (e.g., updated price information, coupon information, updated display information, updated music or tones information, lighting level information, sensor level information, software updates, etc.).

In embodiments of the present disclosure where the screen 152 comprises an electronic visual display, such as an LCD, LED, OLED, etc., (not shown), the same non-limiting advantage of a shelf edge system 100 having one or more communication devices 180 capable of wired or wireless communication with a central location is obtained. The communication devices, when used in connection with an electronic visual display, would permit control of the visual displays remotely and allow advertisers or store owners to communicate a greater swath of information to shelf edge systems, whether individually, in unison, or some other combination, so as to attract the attention to of a shopper at or near a shelf in a store.

Figure 14:
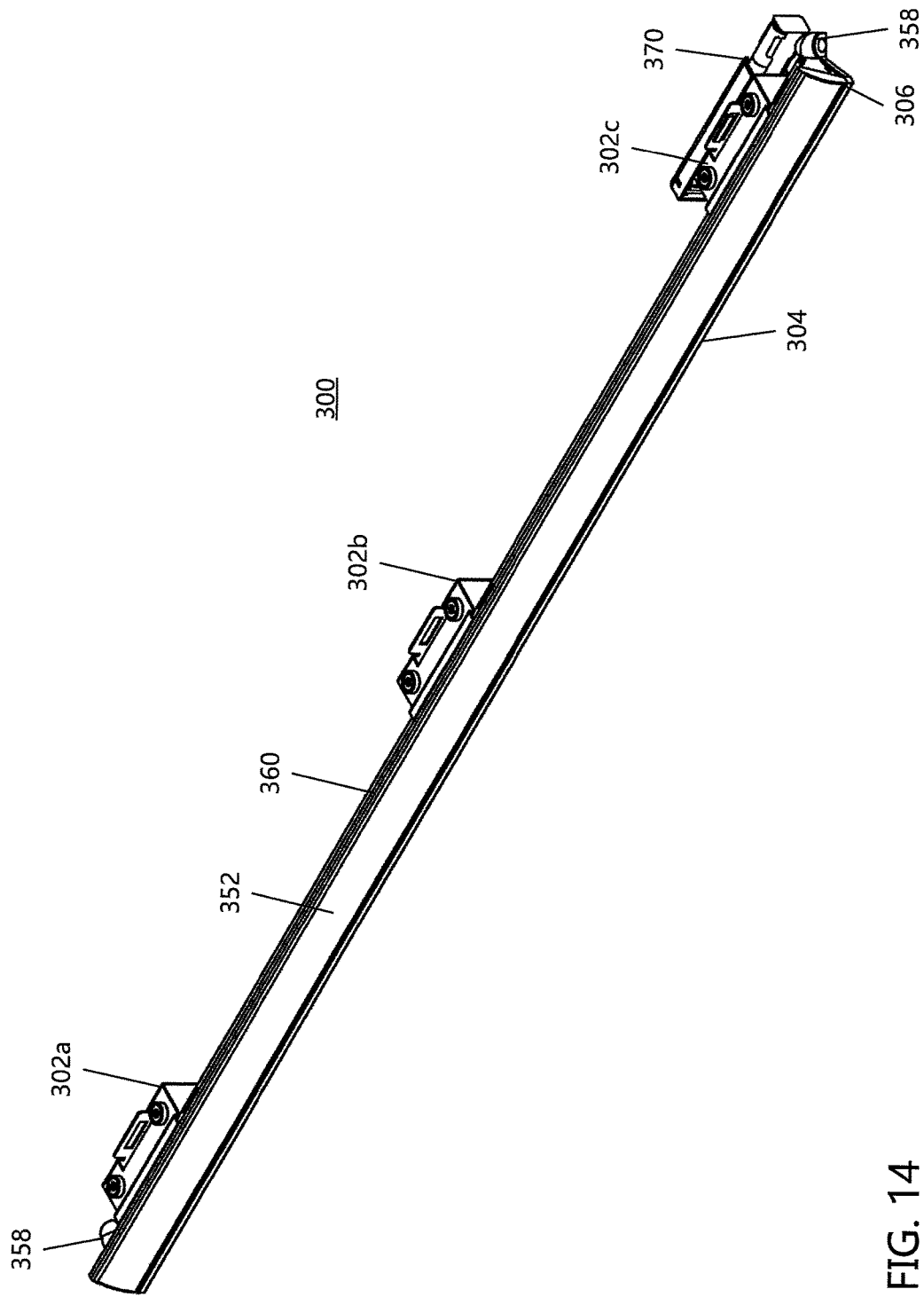
FIG. 14 is an illustration according to another non-limiting embodiment of the present disclosure showing a front elevation view of a long end shelf system adapted to fit on an associated shelf and including more than one support brackets; and, FIG. 15 is an illustration showing a bottom elevational view of the end shelf system of FIG. 14.
Figure 15:
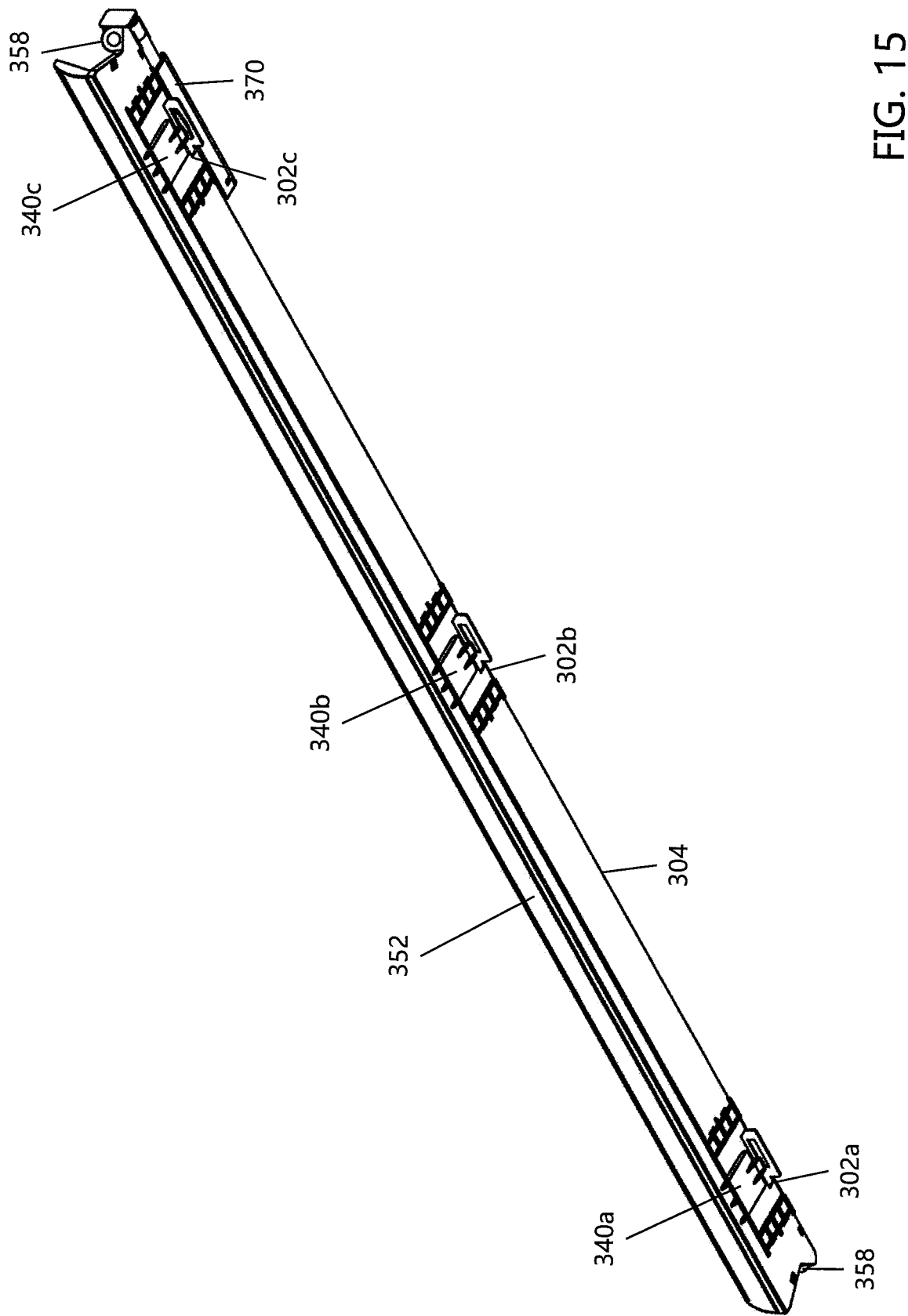

Referring now to FIGS. 14-15, there is illustrated a shelf edge system in accordance with another and/or alternative non-limiting embodiment of the present disclosure. Many of the components and features of the shelf edge system of FIGS. 14-15 are the same or similar to the components and features of the shelf edge system of FIGS. 1-13, thus are incorporated herein and will not be repeated in detail herein.

As mentioned above, the shelf edge system and/or components thereof as disclosed herein can be formed to have wide range of section lengths. For example, it was previously stated that: (i) the support bracket 102 can be provided in sections, such as, for example, six-inch long sections, one-foot long sections, four-foot long sections, eight-foot long sections, etc., and (ii) the display system bracket 104 can be provided in sections, such as, for example, four-inch sections, one-foot sections, four-foot sections, eight-foot sections, etc. Sections of varying length for components such as the support bracket and display system bracket may be necessary to accommodate shelf edge systems of varying lengths.

In FIGS. 14 and 15, there is illustrated a shelf edge system in accordance with another non-limiting embodiment of the present disclosure with the shelf edge system 300 having a longer length than that of shelf edge system 100 illustrated in FIGS. 1-13. The shelf edge system 300 generally consists of the same three main components as system 100, including support brackets 302a-302c, a display system bracket 304, and a display system 306. Shelf edge system 300 also includes other components present in the shelf edge system 100, including a housing 360 adapted to protect the display system 306, and a power supply 370 for providing electricity to the display system. Moreover, shelf edge system 300 also includes extension panels 340a-340c adapted to engage (e.g., frictionally) at least a portion of support brackets 302a-302c, a light diffusing screen 352, and at least one motion detection system 358.

The primary difference between shelf edge system 300 in FIGS. 14-15 and shelf edge system 100 in FIGS. 1-13 is the size of the shelf edge systems and/or components thereof. For example, shelf edge system 300 can be formed from about 0.5-40 foot sections, more typically from about one- to 25-foot sections, and more typically from about two- to 20-foot sections. In one preferred, non-limiting configuration, the shelf edge system 300 is formed in four-foot sections. Accordingly, while the shelf edge system of FIGS. 14-15 includes a magnetic arrangement similar to the shelf edge system of FIGS. 1-13, the increased length of system 300 requires additional magnets in order to adequately magnetically support the weight of support brackets 302a-302c, display system bracket 304, and display system 306 from the underside of an associated shelf.

In another and/or alternative non-limiting aspect of the shelf edge system shown in FIGS. 14-15, the system 300 is illustrated as having only one power supply 370 for three support brackets 302a-302c, compared with system 100 shown in FIGS. 1-13 as including one power supply 170 for one support bracket 102. In this regard, power supply 370 can be adapted to provide sufficient power to all three support brackets 302a-302c, which may be achieved by increasing the size of an associated battery pack, etc.

In operation, one non-limiting method of easily and conveniently installing and/or using a shelf edge system as described above with respect to FIGS. 1-13 can comprise one or more steps. Initially, one or more magnets 116 can optionally be connected to the connection flange 112 of the support bracket 102. Next, the support bracket 102 can be attached to the underside surface 206b of a shelf edge/end 204 by inserting the connection end 118 of the connection flange 112 in the gap/groove 210 created by the C-shaped channel 208 of the shelf end, and allowing the one or more magnets to magnetically attach the support bracket to the underside of the shelf. Subsequently, the display system bracket 104 can be connected to the support bracket 102 such that the connection portion 142 of the extension panel 140 of the display system bracket is positioned at or near the connection portion 126 of the extension flange 108 of the support bracket. The display system bracket 104 can be caused to move toward the support bracket 102, thereby engaging the ratcheting connection between the display system bracket and support bracket of the shelf edge system. As the display system bracket 104 is continually caused to move toward the support bracket 102, the ratcheting portion 128 of the support bracket and the ratcheting portion 142 of the display system bracket can simultaneously tighten and prevent the display system bracket and the support bracket from separating. As the display system bracket 104 is released, the ratcheting portion of the shelf edge system is sufficient to hold the display system bracket in engagement with the support bracket. In embodiments where there is provided a housing 160, the housing can then be connected to the display system bracket 104.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

What is claimed:

1. A shelf edge system, wherein said shelf edge system comprises:
    at least one support bracket including a first connection arrangement and a second connection arrangement, the at least one support bracket connected to the shelf edge by the first connection arrangement, said at least one support bracket further comprising a connection flange having the first connection arrangement, a support flange, and an extension flange having the second connection arrangement;
    a display system including a circuit board and a lighting arrangement connected to the circuit board, the lighting arrangement adapted to emit a light in response to a signal;
    a display system bracket including a connection arrangement, the display system mounted to a portion of the display system bracket, the connection arrangement connecting the display system bracket to the second connection arrangement of the at least one support bracket; and,
    a power supply mounted to the support bracket and electronically connected to the display system.

2. The shelf edge system of claim 1, wherein the extension flange and the connection flange extend perpendicularly from the support flange to form a C-shape of the at least one support bracket.

3. The shelf edge system of claim 1, further comprising at least one motion detection system connected to the circuit board, the at least one motion detection system providing the signal to the lighting arrangement based on a movement detected by the at least one motion detection system.

4. The shelf edge system of claim 1, further comprising a display system housing secured to the display system bracket and adapted to cover and protect the display system.

5. The shelf edge system of claim 1, wherein the power supply further comprises a removable battery pack stored in an enclosure and containing one or more batteries.

6. The shelf edge system of claim 1, further comprising at least one communication device in electronic communication with the display system.

7. The shelf edge system of claim 6, wherein the at least one communication device further comprises one or more contacts adapted to communicate with an adjacent shelf edge system.

8. The shelf edge system of claim 6, wherein the at least one communication device is in wired or wireless communication with a central server.

9. A shelf edge system, wherein said shelf edge system comprises:
    at least one support bracket including a first connection arrangement and a second connection arrangement, the at least one support bracket connected to the shelf edge by the first connection arrangement, said first connection arrangement of the at least one support bracket comprising one or more magnets;
    a display system including a circuit board and a lighting arrangement connected to the circuit board, the lighting arrangement adapted to emit a light in response to a signal;
    a display system bracket including a connection arrangement, the display system mounted to a portion of the display system bracket, the connection arrangement connecting the display system bracket to the second connection arrangement of the at least one support bracket; and,
    a power supply mounted to the support bracket and electronically connected to the display system.

10. The shelf edge system of claim 9, wherein said shelf edge system further comprises at least one motion detection system connected to the circuit board, the at least one motion detection system providing the signal to the lighting arrangement based on a movement detected by the at least one motion detection system.

11. A shelf edge system, wherein said shelf edge system comprises:
    at least one support bracket including a first connection arrangement and a second connection arrangement, the at least one support bracket connected to the shelf edge by the first connection arrangement, the second connection arrangement of the at least one support bracket and the connection arrangement of the display system bracket both comprising a ratcheting portion;

a display system including a circuit board and a lighting arrangement connected to the circuit board, the lighting arrangement adapted to emit a light in response to a signal;

a display system bracket including a connection arrangement, the display system mounted to a portion of the display system bracket, the connection arrangement connecting the display system bracket to the second connection arrangement of the at least one support bracket; and, a power supply mounted to the support bracket and electronically connected to the display system.

12. The shelf edge system of claim 11, wherein said shelf edge system further comprises at least one motion detection system connected to the circuit board, the at least one motion detection system providing the signal to the lighting arrangement based on a movement detected by the at least one motion detection system.

13. A shelf edge system, wherein said shelf edge system comprises:

at least one support bracket including a first connection arrangement and a second connection arrangement, the at least one support bracket connected to the shelf edge by the first connection arrangement;

a display system including a circuit board and a lighting arrangement connected to the circuit board, the lighting arrangement adapted to emit a light in response to a signal;

a display system housing secured to the display system bracket and adapted to cover and protect the display system, the display system housing further comprising generally vertically oriented wall portion and a generally horizontally oriented wall portion;

a display system bracket including a connection arrangement, the display system mounted to a portion of the display system bracket, the connection arrangement connecting the display system bracket to the second connection arrangement of the at least one support bracket; and, a power supply mounted to the support bracket and electronically connected to the display system.

14. The shelf edge system of claim 13, wherein the display system further comprises a screen at least partially disposed within the generally vertically oriented wall portion of the display system housing.

15. The shelf edge system of claim 14, wherein the screen is adapted to diffuse the light emitted by the lighting arrangement in response to the signal.

16. The shelf edge system of claim 15, further comprising a first and second U-shaped channel on the generally vertically oriented wall portion and an interchangeable translucent panel supported by the first and second U-shaped channels.

17. The shelf edge system of claim 16, wherein the interchangeable translucent panel is located in front of the screen of the display system and the screen illuminates the interchangeable translucent panel.

18. The shelf edge system of claim 14, wherein the display system includes an electronic visual display.

19. The shelf edge system of claim 13, wherein said shelf edge system further comprises at least one motion detection system connected to the circuit board, the at least one motion detection system providing the signal to the lighting arrangement based on a movement detected by the at least one motion detection system.

20. A method for using a shelf edge system, wherein said shelf edge system comprises:

providing at least one support bracket including a first connection arrangement and a second connection arrangement, the at least one support bracket being connected to the shelf edge by the first connection arrangement, said first connection arrangement of the at least one support bracket comprising one or more magnets; a display system including a circuit board and a lighting arrangement connected to the circuit board; a display system bracket including a connection arrangement, the display system mounted to a portion of the display system bracket, and the connection arrangement connecting the display system bracket to the second connection arrangement of the at least one support bracket, and a power supply mounted to the support bracket and electronically connected to the display system;

detecting a movement with at least one motion detection system;

providing a signal in response to detecting the movement with the at least one motion detection system; and, emitting a light with the lighting arrangement in response to the signal.

21. A shelf edge system, wherein said shelf edge system comprises:

at least one support bracket including a connection flange, a support flange, and an extension flange, the connection flange extending from the support flange and including a first connection arrangement, the extension flange extending from the support flange and including a second connection arrangement, said first connection arrangement of the at least one support bracket comprising one or more magnets;

a display system including a lighting arrangement and at least one motion detection system connected to a circuit board, the lighting arrangement adapted to emit a light in response to a signal generated by the at least one motion detection system;

a display system bracket including a connection arrangement;

a display system housing at least partially covering the display system; and a power supply electrically connected to the display system, wherein the first connection arrangement of the connection flange connects the at least one support bracket to the shelf edge, the second connection arrangement of the extension flange connects to the connection arrangement of the display system bracket, the display system is mounted to a portion of the display system bracket, the display system housing is secured to the display system bracket, and the power supply is mounted to the support flange of the support bracket.

* * * * *